July 30, 1957 C. E. LOMAX 2,801,286
TOLL SWITCHING TELEPHONE SYSTEM
Filed Dec. 1, 1955 7 Sheets-Sheet 1

INVENTOR.
Clarence E. Lomax
BY
Smith, Olsen, Baird and Miller
Attys.

TOLL SWITCHING TELEPHONE SYSTEM

Filed Dec. 1, 1955

INVENTOR.
Clarence E Lomax
BY
Smith, Olsen, Baird and Miller
Attys.

INVENTOR.
Clarence E. Lomax
BY
Smith, Olsen, Baird and Miller
Attys.

INVENTOR.
Clarence E. Lomax
BY
Smith, Olsen, Baird and Miller
Attys.

INVENTOR.
Clarence E. Lomax
BY
Smith, Olsen, Baird and Miller
Attys.

COMBINED LOCAL & TOLL CONNECTOR 600

INVENTOR.
Clarence E. Lomax
BY
Smith, Olsen, Baird and Miller
Attys.

TOLL SWITCHING TELEPHONE SYSTEM

Filed Dec. 1, 1955 7 Sheets-Sheet 7

INVENTOR.
Clarence E. Lomax
BY
Smith, Olsen, Baird and Miller
Attys.

2,801,286

TOLL SWITCHING TELEPHONE SYSTEM

Clarence E. Lomax, Chicago, Ill., assignor to General Telephone Laboratories, Incorporated, a corporation of Delaware Application December 1, 1955, Serial No. 550,386

7 Claims. (Cl. 179—27)

Figure 1:
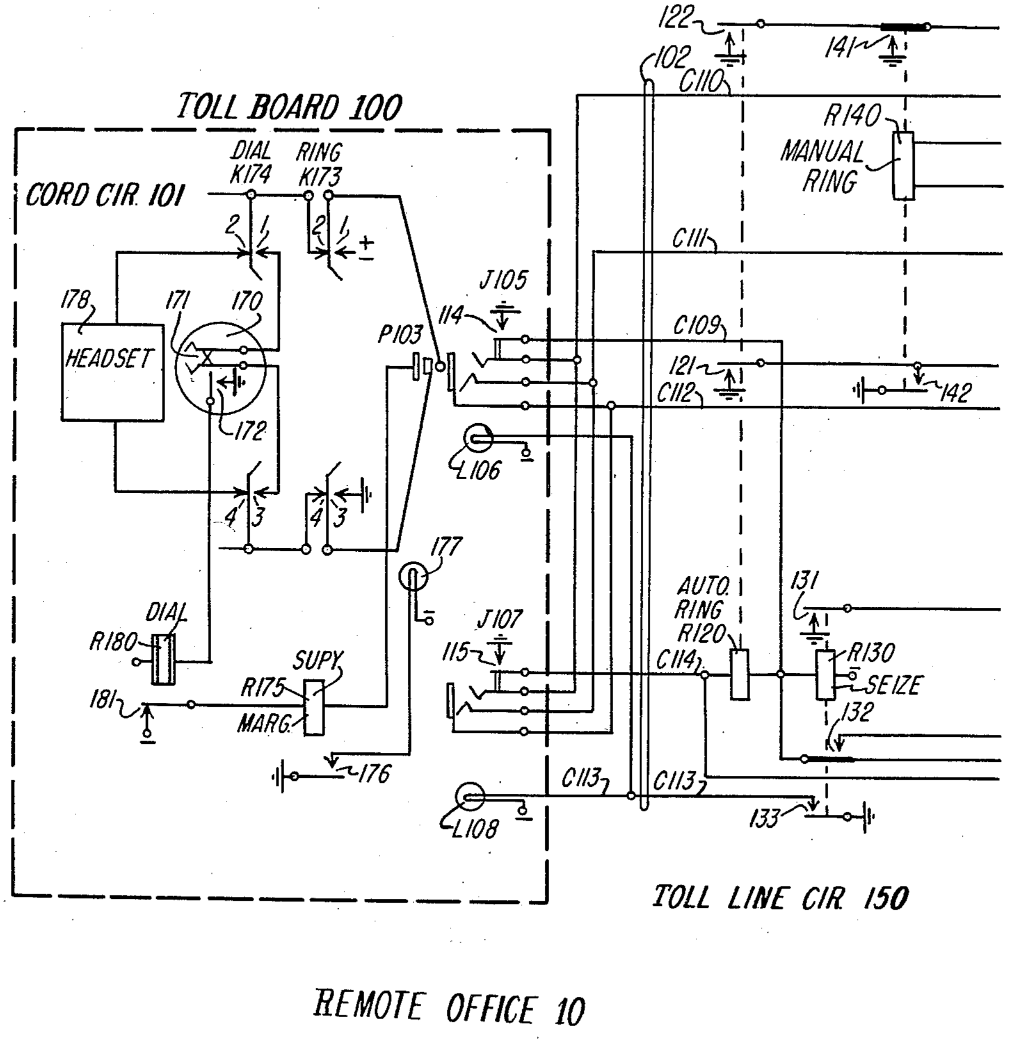

The present invention relates to telephone systems, and more particularly to such systems of the toll switching type.

A toll switching telephone system usually comprises an office provided with a toll board and a plurality of first toll line circuits accessible thereto, an exchange provided with a plurality of second toll line circuits and a corresponding plurality of associated toll first selectors accessible thereto, and a corresponding plurality of toll lines interconnecting the corresponding pairs of first and second toll line circuits. Also the exchange normally comprises trunks and toll transmission selectors accessible to the toll first selectors, combination connectors accessible to the toll transmission selectors, and subscriber lines accessible to the combination connectors. In this system the toll first selectors are necessary to complete toll connections to the trunks, which do not ordinarily require the supply thereto of transmission battery; while the toll transmission selectors are necessary to complete toll connections, through the combination connectors, to the subscriber lines, which ordinarily require the supply thereto of transmission battery. While this arrangement is entirely satisfactory in operation, and necessary in large exchange networks, it requires ranks of toll first selectors and ranks of toll transmission selectors, notwithstanding the fact that in a given exchange the total number of outlets may be relatively small.

Accordingly, it is a general object of the present invention to provide an improved toll switching telephone system comprising a minimum number of ranks of automatic switches in the toll switch train.

Another object of the invention is to provide in a telephone system of the type noted, a combination toll line circuit and toll transmission repeater.

Another object of the invention is to provide an improved toll switching telephone system extending between a remote exchange and a main exchange and including a two conductor toll line and improved terminating toll line circuits arranged to trunk calls over the two conductor toll line from the remote office to the main exchange.

Another object of the invention is to provide terminating toll line circuits embodying improved control and supervisory circuit facilities operative over a two conductor toll line.

Another object of the invention is to provide in terminating toll line circuits, an improved arrangement governed by the application of direct current to the calling toll line circuit thereof for operating the ringing control facility.

A further object of the invention is to provide a combined local and toll connector embodying an improved arrangement for applying to a called subscriber line a toll ringing signal in a toll connection and a local ringing signal in a local connection.

A further object of the invention is to provide a combined local and toll connector embodying an improved busy signal arrangement for returning a tone busy signal in a local connection and a flash busy signal in a toll connection.

Further features of the invention pertain to the particular arrangement of the circuit elements of the telephone system, whereby the above outlined and additional operating features thereof are attained.

*Section 1.—The general arrangement of the telephone system*

The invention, both as to its organization and method of operation, together with further objects and advantages thereof will be best understood by reference to the following specification taken in conjunction with the accompanying drawing, in which the Figs. 1 through 7, taken together, in a side to side arrangement, illustrate the details of the apparatus incorporated in the automatic telephone system.

Figure 2:
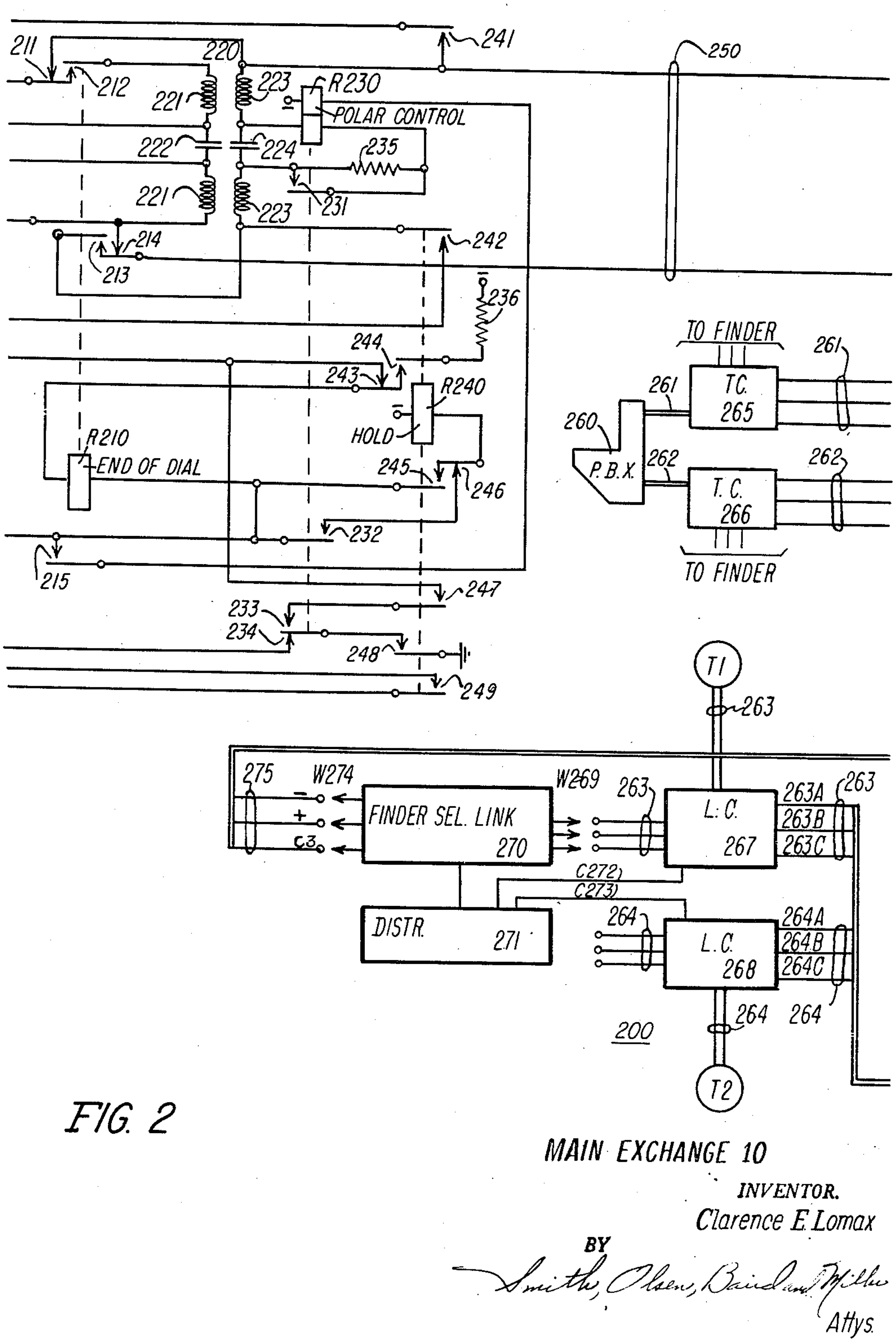
Figure 3:
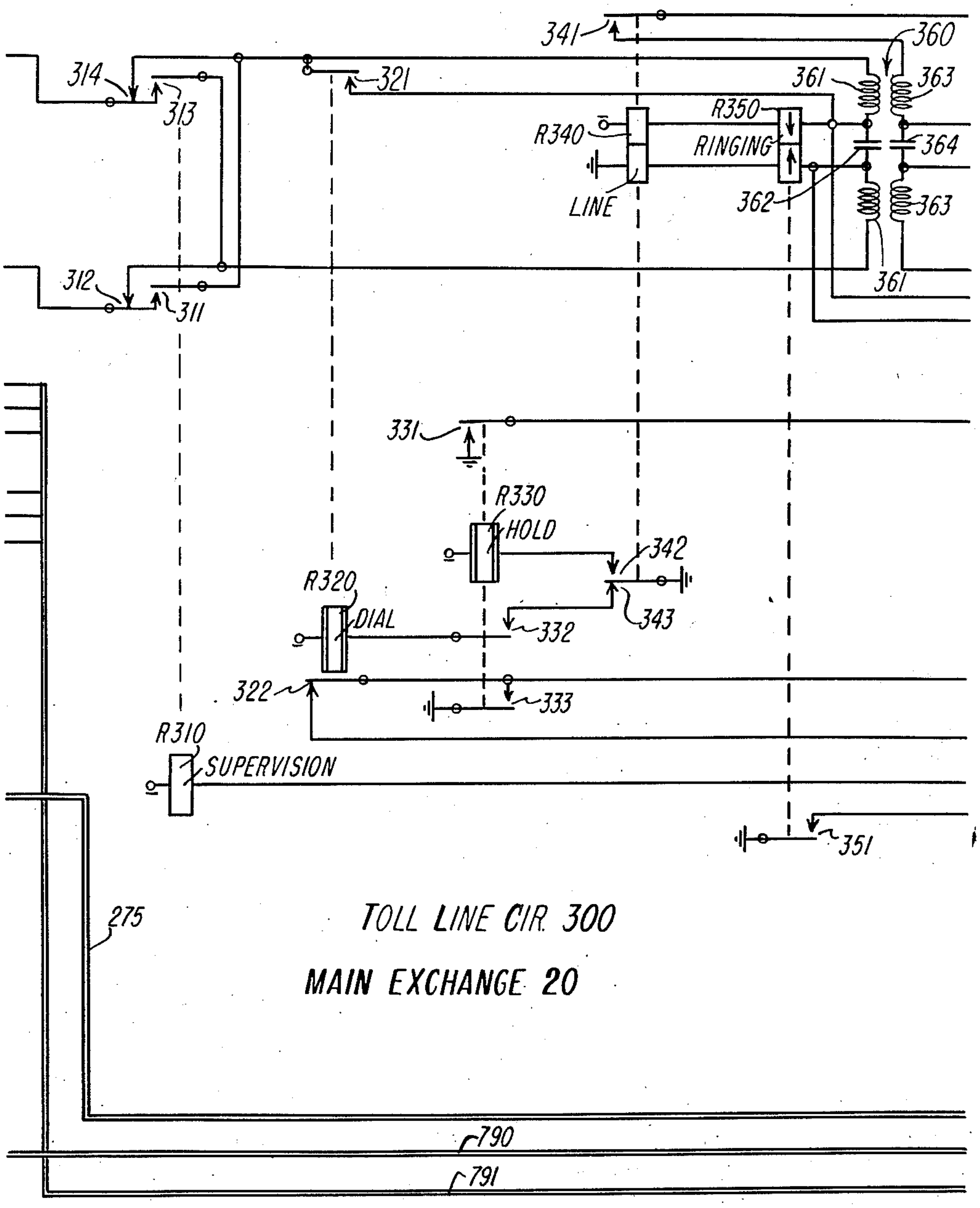
Figure 4:
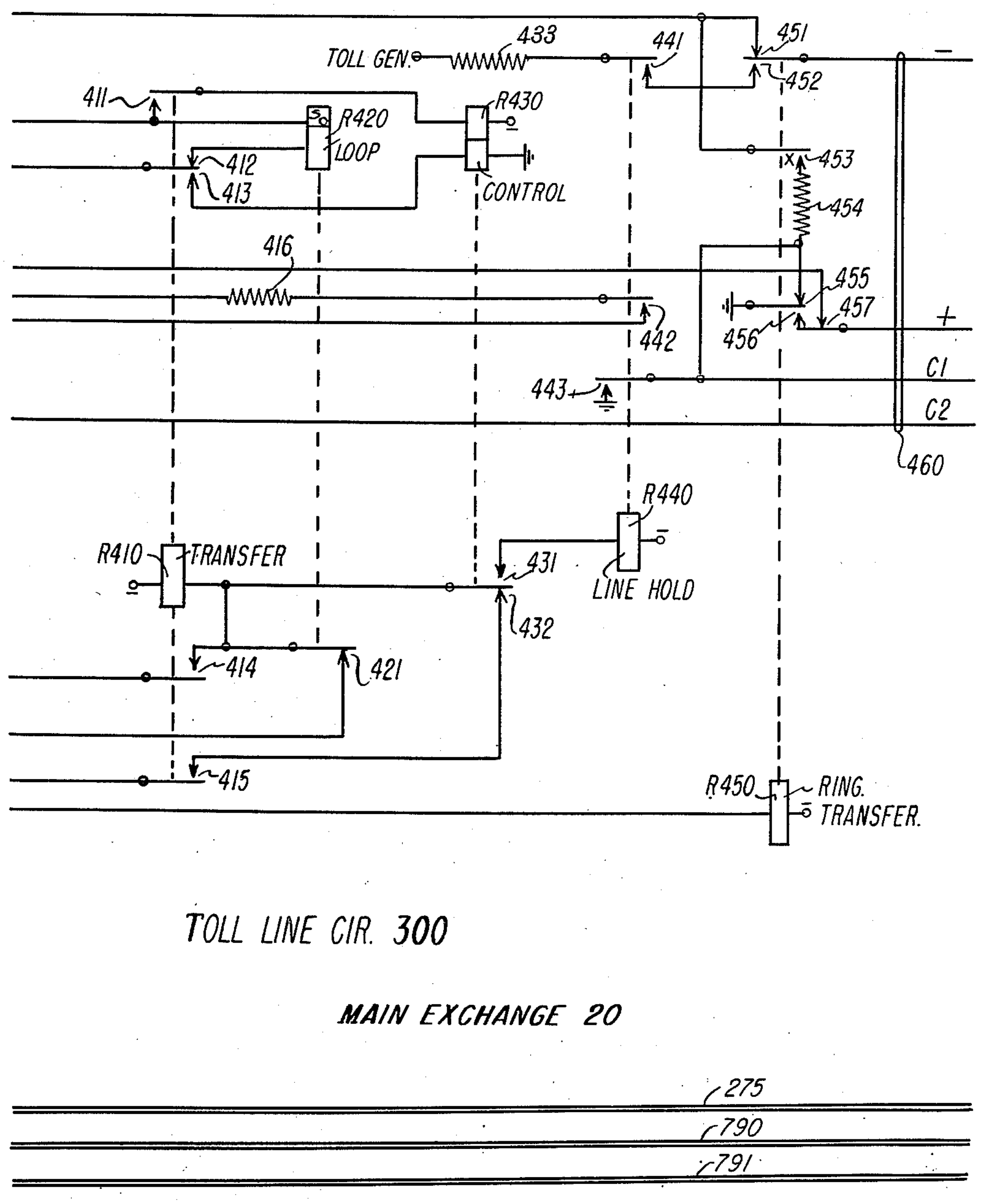
Figure 5:
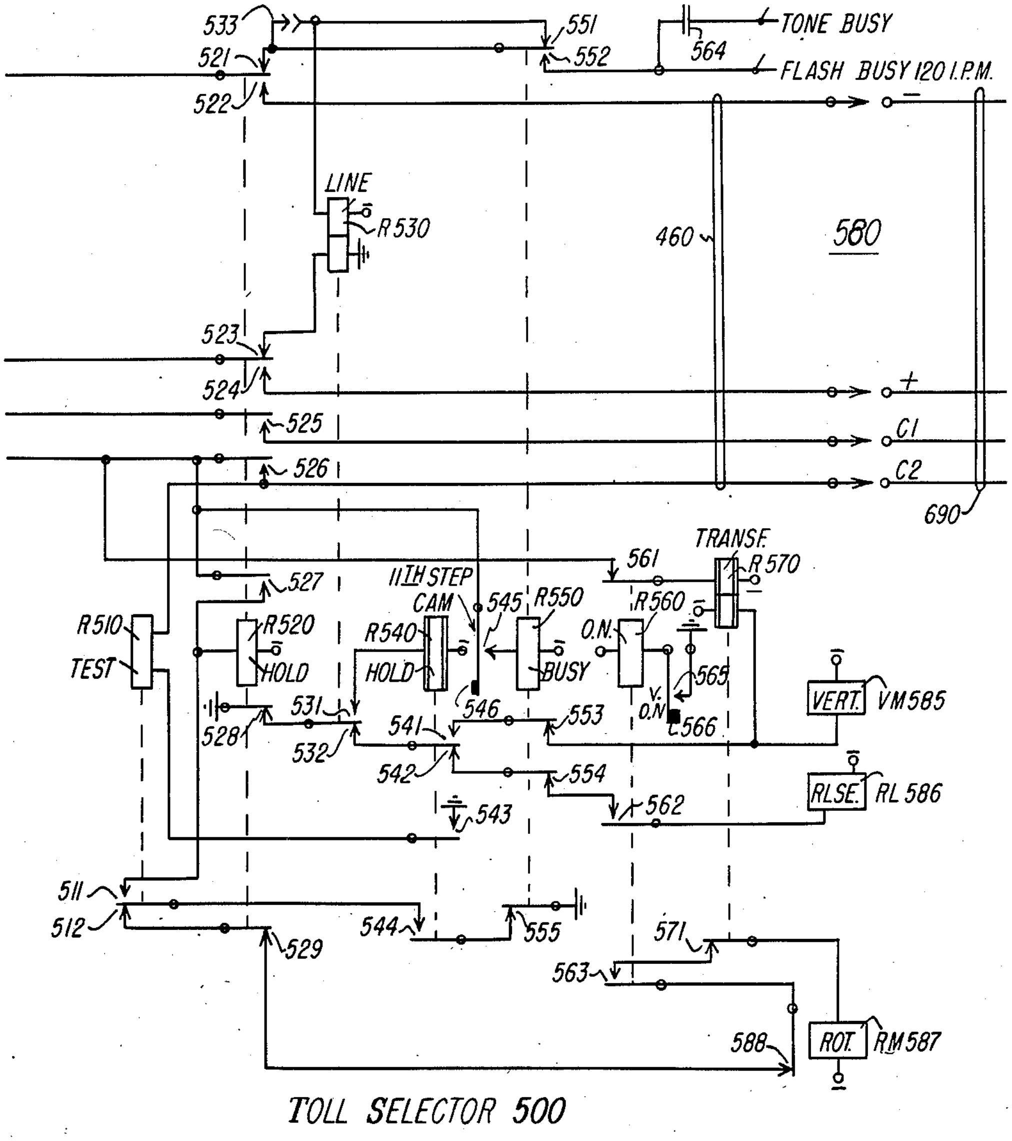

More particularly, a portion of Fig. 1 illustrates the details of one of the cord circuits disposed at the toll board in the remote exchange; another portion of Fig. 1, taken in conjunction with a portion of Fig. 2, illustrates the details of one of the calling toll line circuits in the remote exchange; Figs. 3 and 4, taken together, illustrate the details of one of the called toll line circuits in the main exchange; Fig. 5 illustrates the details of one of the toll selectors in the main exchange; and Figs. 6 and 7 taken together, illustrate the details of one of a group of combined local and toll connectors in the main exchange.

Referring more particularly to Figs. 1 through 7, the telephone system illustrated therein serves an area comprising a remote office 10 and a main exchange 20. The remote office 10 is of any suitable type and comprises a manual dial toll board 100; the main exchange 20 is of the automatic type serving stations of any suitable type and, specifically, a group of subscriber stations 200, including the subscriber stations T1 and T2, and a P. B. X board 260. The subscriber station T1 has a subscriber line 263 extending thereto that is provided with an individually associated line circuit 267; and the subscriber station T2 has a subscriber line 264 extending thereto that is provided with an individually associated line circuit 268. The P. B. X board 260 has a group of P. B. X trunk lines including the trunks 261 and 262 extending thereto each of which is provided with an individually associated trunk circuit 265 and 266, respectively.

The remote office 10 and the main exchange 20 are interconnected by a group of toll lines including the toll line 250, of the one way type, terminating in the toll line circuit 150 and the toll line circuit 300, respectively disposed in the remote office 10 and the main exchange 20; and in the remote office 10 the toll line circuit 150 is further terminated in the toll board 100 via the trunk 102.

The main exchange 20 comprises a local switch train including a group of finder-selector links, a toll switch train comprising a group of toll selectors and a group of combined local and toll connectors accessible to both the local switch train and toll switch train. Specifically, the group of finder-selector links in the local switch train includes the finder-selector link 270 illustrated, which group is provided with a distributor 271, the finder portions of the links having access to the subscriber lines 263 and 264 extending to the subscriber stations T1 and T2, respectively, and the line circuits 267 and 268 individually associated with the subscriber stations T1 and T2 being connected to the distributor 271 by the conductors C272 and C273, respectively. The group of toll selectors in the toll switch train includes the toll selector 500 which is individually connected to the toll line circuit 300 by the trunk 460 extending therefrom. Further, the group of combined local and toll connector 600 which is accessible to the toll selectors 500, etc., via a trunk 690 and is also accessible to the selector portions of the finder-selector links 270, etc., via a trunk 275. Also the combined local and toll connectors 600, etc., have access via a trunk 790 to the group of subscriber lines including the subscriber line 263 and 264 and have access via a trunk 791 to the group of P. B. X trunk lines including the P. B. X trunks 261 and 262.

Thus the operator at the toll board 100 in the remote office 10 may complete a call to any one of the subscriber stations in the group 200 or to the P. B. X board 260 in the main exchange 20 via the trunk 102 and the toll line circuit 150 in the remote office 10, the toll line 250 interconnecting the remote office 10 and the main exchange 20 and the toll line circuit 300, the trunk 460, the toll selector 500, the trunk 690, and the combined local and toll connector 600 in the main exchange 20, and the subscriber at any one of the subscriber stations in the group 200, such as T1, may have access to any other one of the subscriber stations in the group 200 or the P. B. X board 260 in the main exchange via the subscriber line 263, the finder-selector link 270, the trunk line 275 and the combined local and toll connector 600.

Section 2.—*The apparatus incorporated in the telephone system*

In the remote office 10 the toll board 100 is of the manual dial type and comprises a number of cord circuits including, as shown in Fig. 1, the cord circuit 101 that terminates in a plug P103. Also the cord circuit 101 comprises a ring key K173, a dial key K174 as well as a relay group including a supervisory relay R175 and a dial relay R180. In addition the cord circuit 101 is connectible to a head set 178 and to an impulse transmitting mechanism of the dial type 170 and includes a supervisory lamp 177 disposed at the toll board 100. The trunk 102 which terminates in the jacks J105 and J107 at the toll board 100 and the lamps L106 and L108 respectively associated with the jacks extends to the calling toll line circuit 150. As shown in Figs. 1 and 2, the toll line circuit 150 comprises a repeater coil 220 including the individual coils 221 and 223 and a relay group including an automatic ring relay R120, a seizure relay R130, a manual ring relay R140, an end of dial relay R210, a control relay R230 and a hold relay R240.

In the main exchange 20, the subscriber stations T1 and T2 and the P. B. X board 260 are of any suitable type employing conventional ringing, dialing and answering apparatus, the line circuits 267 etc., the distributors 271, etc., and the trunk circuits 265, etc., are of any suitable type, while the finder-selector links 270, etc., are of a conventional Strowger type.

The toll line circuits 300 etc., comprise, as shown in Figs. 3 and 4, a repeater coil 360 including the individual coils 361 and 363 and a relay group including a supervisory relay R310, a dial relay R320, a hold relay R330, a line relay R340, a ringing relay R350, a transfer relay R410, a loop relay R420, a control relay R430, a line hold relay R440 and a ringing transfer relay R450.

The toll selectors 500, etc., as illustrated in detail in Fig. 5, each includes a relay group including a test relay R510, a hold relay R520, a line relay R530, a hold relay R540, a busy relay R550, an off-normal relay R560 and a transfer relay R570. Further, the toll selectors 500, etc., each comprises a Strowger mechanism 580 provided with a wiper set including 4 wipers, respectively, the negative line wiper, the positive line wiper, the C1 control wiper and the C2 control wiper, a vertical magnet VM585 for driving the wiper carriage step by step in the vertical direction, a rotary magnet RM587 for driving the wiper carriage step by step in the rotary direction, and a release magnet RL586 for releasing the wiper carriage and for causing it to be returned to its normal rotary and vertical positions. Also associated with the wiper carriage of the Strowger mechanism 580 are the vertical off-normal springs 566 that are operated when the wiper carriage is driven one step in the vertical direction away from its normal vertical position, and the springs 546 that are operated when the wiper carriage is driven eleven steps in the rotary direction away from its normal rotary position.

Figure 6:
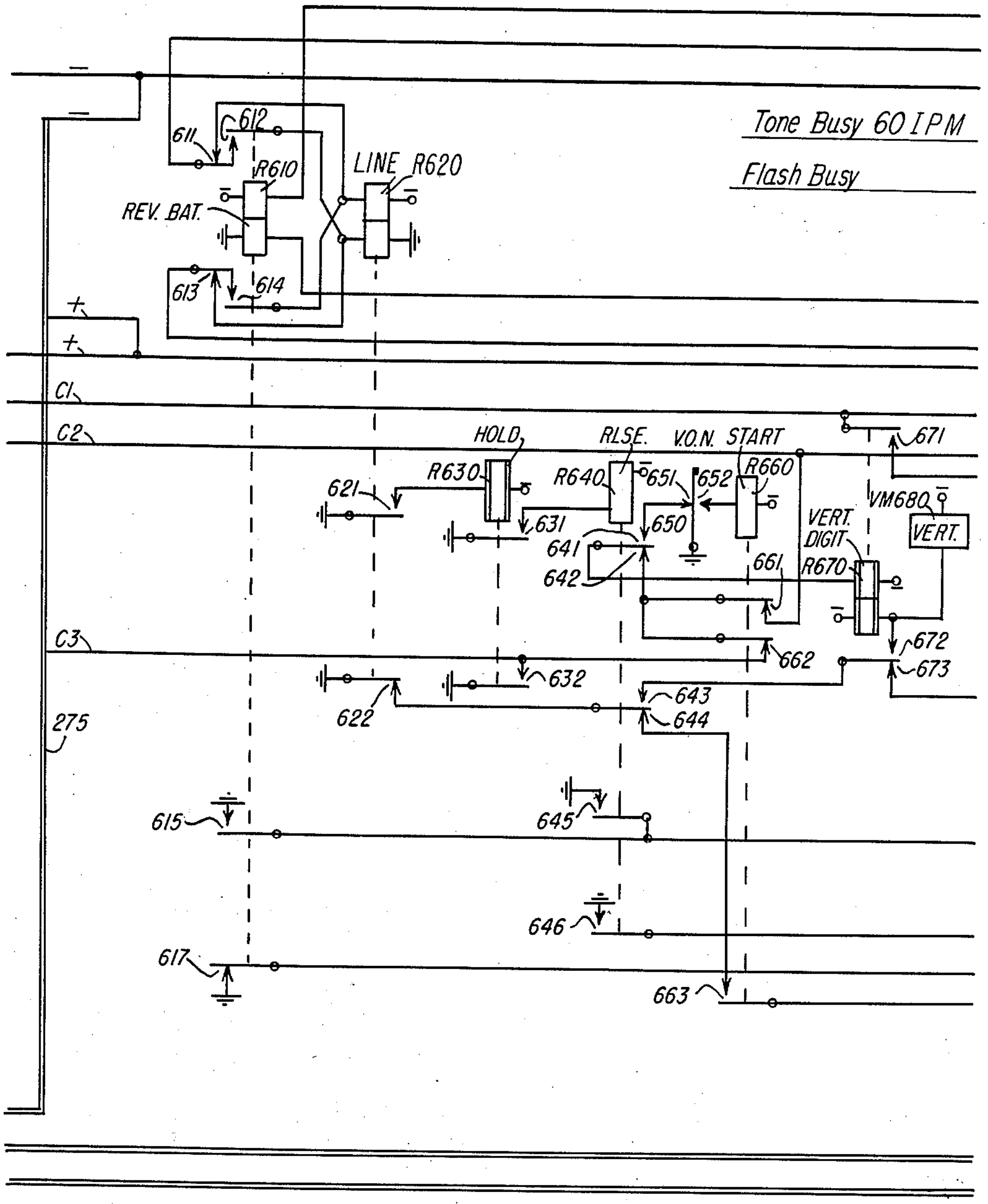
Figure 7:
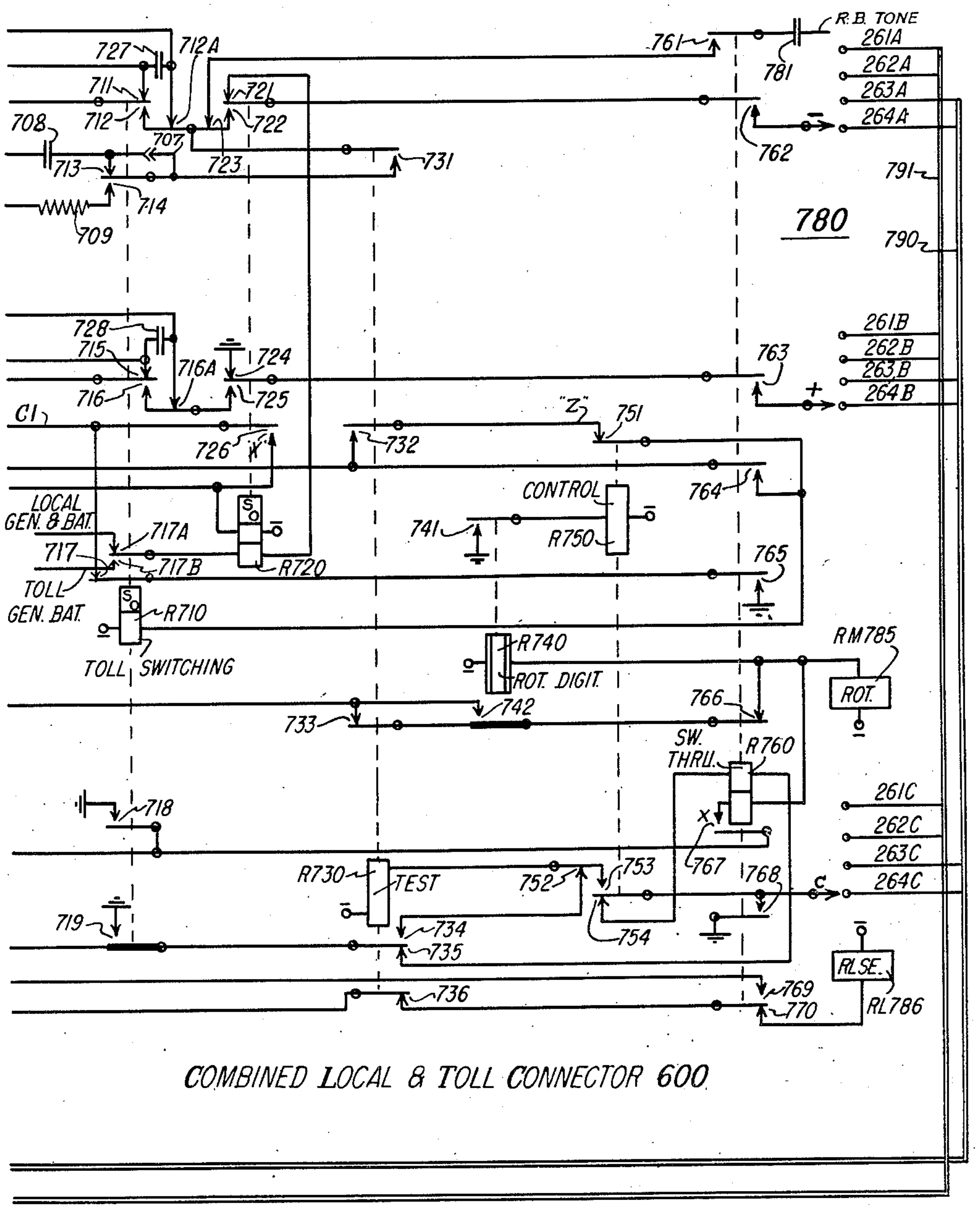

Each of the combined local and toll connectors 600, etc., comprises, as shown in Figs. 6 and 7, a relay group including the reverse battery relay R610, a line relay R620, a hold relay R630, a release relay R640, a start relay R660, a vertical digit relay R670, a toll switch relay R710, a ring cutoff relay R720, a test relay R730, a rotary digit relay R740, a control relay R750, and a switch through relay R760. Further, each of the combined local and toll connectors 600, etc., comprises a Strowger mechanism 780 provided with a wiper set including a negative line wiper, a positive line wiper and a control wiper, a vertical magnet VM680 for driving the wiper carriage step by step in the vertical directon, a rotary magnet RM785 for driving the wiper carriage step by step in the rotary direction, and a release magnet RL786 for releasing the wiper carriage and for causing it to be returned to its normal rotary and vertical positions. Also included in the Strowger mechanism 780 is a set of vertical off-normal springs 650 which are operated when the wiper carriage is driven one step in the vertical direction away from its normal vertical position.

A better understanding of the connection and arrangement of the apparatus incorporated in the telephone system will be facilitated from a consideration of the extension of calls involving the various stations in the telephone system.

Section 3.—*Local calls in the main exchange*

First assuming that a call is initiated at the subscriber station T1 in the main exchange 20 that is to be completed locally to another subscriber station, such as T2 therein, the line circuit 267 is controlled via the subscriber line 263 in order to govern the operation of the distributor 271 over the start conductor C272; whereby the idle one of the links, such for example, as the finder-selector link 270 illustrated, is assigned thereto. The finder portion of the finder selector link 270 operates to find at its wiper set W269 the subscriber line 263 extending to the calling subscriber station T1; whereby the line circuit 267 is operated in order to mark the subscriber line 263 as busy to any other links having access thereto. Also the selector portion of the link 270 operates to return dial tone over the subscriber line 263 to the calling subscriber station T1; whereby the subscriber at the calling subscriber station T1 proceeds to dial the directory number of the called subscriber station; which number, in the present illustration, is a three digit number. The first digit dialed at the first subscriber station T1 effects operation of the selector portion of the finder selector link 270; whereby it operates at its wiper set W274 to select first the group of trunks extending to the corresponding group of combination connectors including the combination connector 600 and then to an idle trunk therein. In the group of trunks, the wiper set W274 searches for a trunk marked idle by battery on the control conductor thereof, and in the present illustration, seizes the idle trunk line 275 which extends to the local and toll connector 600 and for which the control conductor C3 thereof is connected to battery potential via the contacts 662 and 642 and through the upper winding of the vertical digit relay R670 in the combination connector 600. In the finder-selector link 270, ground potential is applied via the wiper set W274 to the C3 conductor of the trunk line 275 which causes the relay R670 in the combined local and toll connector 600 to operate over the above described path. At the same time the finder-selector link 270 completes over the line conductors of the trunk 275 a loop through the subscriber line 263 and the dialing mechanism of the subscriber station T1 to battery potential via contacts 711 and 611 and the upper winding of the relay R620, and to ground potential via contacts 715 and 613 through the lower winding of the relay R620, whereby the relay R620 is operated.

Upon operating, the line relay R620 closes contacts 621 thereby completing the operating circuit for the hold relay R630 which upon operation closes contacts 631 for completing an operating circuit for the release relay R640. In addition the relay R630 closes at contacts 632 ground potential to the C3 conductor of the trunk 275 to mark the trunk 275 as busy to other finder-selector links having access thereto. The operated relay R640 interrupts at contacts 642 a circuit extending from battery potential at the upper winding of relay R670 via contacts 661 to the C2 conductor of the trunk 690 whereby the trunk 690 is marked as busy to the toll selectors 500, etc., having access thereto, and also interrupts a multiple circuit including contacts 662 extending to the C3 conductor of the trunk 275. In addition relay R640 completes contacts 641, a circuit for energizing the upper winding of the relay R670 whereby the latter relay is maintained operated, it being of the slow to release type. The operated relays R640 and R670 close at contacts 643 and 672, respectively, two points in a pulsing circuit to the vertical magnet VM680 and in a holding circuit to the lower winding of relay R670 in order to prepare the combined local and toll connector 600 for receiving the second digit dialed at the calling subscriber station T1.

Upon dialing of the second digit the previously traced loop through the upper and lower windings of the relay R620 is interrupted with each impulse of the digit whereby the relay R620 follows. Each time the relay R620 restores and then reoperates, it interrupts and then completes at contacts 621 the circuit for maintaining the hold relay R630 operated, whereby the relay R630 is retained in its operated position during impulsing as it is of the slow to release type. Further, each time the relay R620 restores and reoperates, it completes and then interrupts at contacts 622 a further point in the hold and pulsing circuits including contacts 643 and 672 for energizing the lower winding of the vertical digit relay R670 and for energizing the vertical magnet VM680; whereby the relay R670 is maintained operated during the second digit, it being of the slow to release type, and the vertical magnet VM680 is operated and restored with each second digit dialing impulse in order to drive the wiper carriage of the Strowger mechanism 780 step by step in the vertical direction to the level of contact sets including the contact set terminating the called subscriber line 264. When the wiper carriage of the Strowger mechanism 780 is driven one step in the vertical position, the sets of vertical off normal springs 650 are operated to interrupt at contacts 651 the circuit including contacts 641 maintaining the upper winding of the vertical digit relay R670 operated and to complete at contacts 652 a circuit for operating the start relay R660. At the conclusion of the second digit the holding circuit to the relay R670 and the pulsing circuit to the vertical magnet VM680 are interrupted at contacts 622 whereby the relay R670 restores shortly thereafter preparing at contacts 673 a point in the circuit including contacts 622, 643, 733 and 766 for operating, in accordance with dialing impulses of the third digit, the rotary digit relay R740 and the rotary magnet RM785. The combination connector 600 is now prepared to receive the dialing impulses of the third digit dialed at the subscriber station T1.

Upon dialing of the third digit at the subscriber station T1, the line relay R620 follows the impulsing and is restored and then reoperated, in a manner as described above, to interrupt and then recomplete at contacts 621 a circuit whereby the hold relay R630 is maintained operated, and to complete and then interrupt at contacts 622 the previously traced path for operating the relay R740 and the rotary magnet RM785. During the impulsing the rotary digit relay R740 is operated and maintained operated, it being of the slow to release type, and the rotary magnet is operated and then restored in accordance with the dial impulsing in order to drive the wiper carriage step by step in the rotary direction away from its normal rotary position to select the contact set terminating the called subscriber line 264. The rotary digit relay R740, upon operating in response to the first impulse of the third digit, closes at contacts 742 a multiple pulsing path to relay R740 and to the rotary magnet RM785 and closes at contacts 741 a circuit for operating the control relay R750 whereby a circuit is closed at contacts 753 for connecting the C wiper of the Strowger mechanism 780 to the test relay R730. At this time the wiper set of the Strowger mechanism 780 engages the contact set terminating the subscriber line 264 of the called subscriber station T2 and the test relay R730 tests the idle or busy condition of the subscriber line mentioned.

Assuming that the subscriber line 264 is busy ground potential appears on the control conductor 264C and is applied over the C wiper of the Strowger mechanism 780 to operate via contacts 753 the test relay R730. Upon operating the test relay R730 completes at contacts 734 one point in a hold circuit therefore including contacts 646 and 752; and shortly thereafter, when the slow to release relay R740 restores and relay R750 follows, the hold circuit is completed at contacts 752. In addition, the relay R730 completes at contacts 731 a circuit for extending busy tone over a path including contacts 731, 712A, the capacitor 727, and contacts 711 to the negative line conductor of the trunk 275, whereby the busy tone is extended over the subscriber line 263 to the calling subscriber station T1.

In response to the busy tone, the calling party at the subscriber station T1 interrupts the operating loop therethrough to the line relay R620 in the combination connector 600, whereby relays R620, R630, R640 and R730 are successively restored. Upon restoring the relays R620 and R640, complete at contacts 622 and 644, a circuit further including contacts 663 and 770 for operating the release magnet RL786, whereby the wiper carriage of the Strowger mechanism 780 is released and the wiper set thereof caused to disengage the contact set of the called subscriber line 264 and to be returned to its normal rotary and vertical positions. Upon restoring of the wiper set to its normal vertical position, the vertical off-normal switch 650 is again operated to open the contacts 652, whereby the relay R660 is restored and contacts 661 and 662 are closed to apply battery potential through the upper winding of the relay R670 over the previously traced circuits to the C2 conductor of the trunk 690 and to the C3 conductor of the trunk 275. The combined local and toll connector 600 is now indicated as idle and may be seized by any one of the selectors in the local and toll switch trains.

Assuming that the subscriber line 264 is idle, battery potential appears on the control conductor 264C and is applied over the C wiper of the Strowger mechanism 780 via contacts 753 to shunt the winding of the test relay R730 whereby the latter relay is not operated. Shortly thereafter when the vertical digit relay R740 and the control relay R750 restore, as previously explained, whereby battery potential on the C wiper is applied at contacts 754 to energize the switch through relay R760 in a path including the upper winding thereof and contacts 735 and 646.

Upon operating, the relay R760 closes at contacts 767, a holding circuit through the lower winding thereof from battery potential on the windings of the relay R740 and magnet RM785 to ground potential at contacts 645. As the lower winding of the relay R760 is of a high impedance, the relay R740 and the magnet RM785 are not operated. In addition, the relay R760 applies holding ground to the C wiper of the Strowger mechanism 780 at contacts 768, whereby the subscriber line 264 is marked as busy to other connectors having access thereto, and closes contacts 761 to apply ring back tone via contacts 723, 712A, the capacitor 727 and contacts 711 to the negative line conductor of the trunk 275, whereby ring back tone is applied to the calling subscriber line 263. In addition, the operated relay R760 closes at contacts 762 and 763, a ringing loop extending from local ringing generator and battery via contacts 717A, the lower winding of the ring cutoff relay R720, contacts 721, the negative line wiper of the Strowger mechanism 780, the negative line conductor 264A of the called subscriber line 264, the ringing apparatus in the subscriber station T2, the positive line conductor 264B of the called subscriber line 264, the positive line wiper of the Strowger mechanism 780 and contacts 724 to ground potential, whereby the subscriber station T2 is rung.

Responsive to the ringing at the subscriber station T2, the called party thereat, upon answering, completes a D. C. loop therethrough over the above traced ringing path to battery potential associated with the ringing generator whereby the lower winding of the ring cutoff relay R720 is energized. Upon operating, the ring cutoff relay R720 completes its contacts 726 a holding circuit through the upper winding thereof and including the contacts 717 and 765. Additionally, the relay R720 interrupts at contacts 721 and 724 the above traced loop through the called subscriber station T2 to remove generator and battery therefrom and recompletes at contacts 722 and 725 the above traced loop through the called subscriber station T2 via contacts 712A and 716A in a D. C. path through the upper and lower windings of the reverse battery relay R610 to battery potential and ground potential, respectively, and in a talking path via the capacitor 727 and contacts 711, and the capacitor 728 and contacts 715 through the line conductors of the subscriber line 263 through the calling subscriber station T1, whereby the reverse battery relay R610 is operated to reverse at contacts 612 and 614 the polarity on the line conductors of the subscriber line 263 and to apply at contacts 615 holding ground to the relay R760, whereby a talking connection is established between the calling party at the subscriber station T1 and the called party at the subscriber station T2.

The established connection is released on a last party to release basis. Thus, if at the conclusion of the established connection, the subscriber at the calling subscriber station disconnects first, the relays R620, R630 and R640 are restored preparing at contacts 622 and 644 two points in a circuit including contacts 622, 644, 663 and 736 for operating the release magnet RL786 and removing at contacts 632 ground potential from the C3 conductor of the trunk 275, whereby the subscriber line 263 is marked as idle. Subsequently, when the subscriber at the called subscriber station T2 disconnects the loop circuit extending therefrom to the upper and lower winding of the reverse battery relay R610 is interrupted thereby releasing relay R610 and interrupting at contacts 615 the hold circuit to the switch through relay R760. Upon restoring the latter relay completes at contacts 770 the previously traced path for operating the release magnet RL786, and interrupts a contact 765 the previously traced loop for maintaining the ring cut off relay operated, and interrupts at contacts 762 and 763 the connections to the line wipers of the Strowger mechanism 780, whereby the relay R720 is restored and the release magnet RL786 is operated to restore the wiper set of the Strowger mechanism 780 to its normal vertical and rotary positions, thereby causing the vertical off-normal switch 650 to open contacts 652 for restoring relay R660. Upon restoring the relay R660 interrupts at contacts 663 the circuit for operating the release magnet RL786 and completes at contacts 661 and 662 the previously traced paths for applying battery potential to the C2 conductor of the trunk 690 and to the C3 conductor of the trunk 275 whereby these trunks are marked as idle to the selectors in the corresponding toll and local switch trains. When the combination connector 600 is thus released, the line circuit 268 is operated in order to return battery potential to the subscriber line 264 in order to mark it as idle to the connectors having access thereto. At this time the established connection between the calling subscriber station T1 and the called subscriber station T2 is released and all of the apparatus involved therein is completely released and available for further use.

Assuming that at the conclusion of the established connection the subscriber at the called subscriber station T2 disconnects first, the loop through the windings of the reverse battery relay R610 is interrupted, in a manner as previously explained, whereupon the latter relay restores. Thereafter, when the subscriber at the calling subscriber station T1 disconnects, the loop circuit extending therefrom to the upper and lower winding of the line relay R620 is interrupted; whereupon relays R620, R630, R640 and R760 restore, the latter relay interrupting at contacts 765, the circuit for maintaining the ring cutoff relay R720 operated. Additionally, the release magnet RL786 is operated in a manner as previously described, causing the wiper set of the Strowger mechanism 780 to return to its normal vertical and rotary positions, whereby the vertical off-normal switch 650 interrupts the circuit for maintaining the relay R660 operated. At this time, all of the apparatus involved in the connection is completely released and made available for further use.

The P. B. X board 260 may be called from any one of the subscriber stations T1, etc., in the same manner the called connection was completed from the subscriber station T1 to the subscriber station T2, and release of the calling connection is effected in the same manner.

*Section 4.—Call from the toll board in the remote office to a subscriber station in the main exchange*

Now assuming that a call is initiated at the toll board 100 in the remote office 10 by the operator thereat inserting the plug P103 of the cord circuit 101 into a jack, for example, J105 terminating in the toll line circuit 150, the toll line 250, the toll line circuit 300 and the toll selector 500 are prepared for dialing from the operator position. In particular, when the plug P103 is inserted into the jack J105, which jack, as illustrated, is connected via the trunk 102 into the toll line circuit 150 in order to provide the operator with a delayed manual ring facility, ground potential is applied to the conductor C109 of the trunk 102 at contacts 114 and battery potential is applied to the conductor C112 of the trunk 102 from the cord circuit via contacts 181, the winding of relay R175, the sleeve of the plug P103 and the sleeve of the jack J105, and the conductors C110 and C111 of the trunk 102 are connected via the tip and ring, respectively, at the jack J105 and plug P103 in a high impedance loop through the head set 178 via the second and fourth contacts of the ring key K173 and the second and fourth contacts of the dial key K174. Thereafter, in the calling toll line circuit 150 in the remote office 10, the seizure relay R130 is operated from ground potential on conductor C109, thereby closing contacts 131 for completing a circuit from ground potential thereat to battery potential on conductor C112 via the winding of the end of dial relay R210 and at contacts 243 closing contacts 133 for illuminating via condductor C113 of the trunk 102 the busy lamps L106, L108, etc., associated with the jacks J105, J107, etc., terminated in the toll line circuit 150. Upon completion of the circuit through the relay R210, the latter relay is operated but the series connected marginal supervisory relay R175, is not operated at this time. The relay R210 completes at contacts 215 a circuit including contacts 131 for energizing the upper winding of the polar type control relay R230 and at the same time completes at contacts 213, a loop extending from the upper and lower windings of the line relay R340 in the toll line circuit 300 of the main exchange 20 over the two conductor toll line 250 and through the lower winding of the control relay R230 of the toll line circuit 150 in the remote office 10 whereby the line relay R340 operates and both windings of the polar type relay R230 are energized so that the mentioned relay does not operate at this time. Specifically, the mentioned loop circuit extends from battery potential via the upper winding of relay R340, the upper winding of the ringing relay R350, the upper winding 361, contacts 314, the negative line conductor of the toll line 250, the upper winding of the coil 223, the lower winding of the control relay R230, resistor 235, the lower winding of the coil 223, contacts 213, 312, the lower winding of the coil 361, the lower winding of the ringing relay R350, and the lower winding of the line relay R340 to ground potential. In the toll line circuit 300, the ringing relay R350 is of the differential type and current flow through the upper and lower windings thereof in the present directions cause the relay to remain restored. The line relay R340 in the toll line circuit 300 in the main exchange 20, upon operating, completes at contacts 342 a circuit for operating the hold relay R330 therein, whereby ground potential is applied at contacts 331 to the C2 conductor of the trunk 460 extending to the toll selector 500, and at the same time completes at contacts 341 and loop circuit through the loop relay R420 extended thereto over the trunk 460 from the upper and lower winding of the line relay R530 in the toll selector 500. Specifically, the above mentioned loop extends from battery potential through the upper winding of the line relay R530, contacts 551 and 521, the negative line conductor of the trunk 460, contacts 451 and 341, the upper winding of the coil 363, the winding of the loop relay R420, contacts 412, the lower winding of the coil 363, contacts 457, the positive line conductor of the trunk 460, contacts 523 and the lower winding of the relay R530 to ground potential, whereby the relay R420 and the relay R530 are operated. In the toll selector the operated relay R530 closes at contacts 531 a circuit for operating the hold relay R540 therein, and ground potential on the C2 conductor of the trunk 460 completes a circuit via contacts 561 for energizing and operating at the upper winding thereof the transfer relay R570. The relay R540 closes at contacts 541 one point in a circuit including contacts 528, 532, 541 and 553 for holding the transfer relay R570 operated and for pulsing the vertical magnet VM585 which circuiit is incomplete at this time. In addition the relay R540 completes at contacts 543 a test circuit through the winding of the test relay R510 to the C2 wiper of the Strowger mechanism 580 which wiper is not engaging any contacts at this time, and completes at contacts 544 one point in the circuit including contacts 555, 544, 512, 529, 588, 563 and 571 for operating the rotary magnet RM587; whereas the operated relay R570 interrupts the later circuit at the contacts 571. Thus, in response to the operator at the toll board 100 in the remote office 10 inserting the P103 of the cord circuit 101 into the jack J105, the toll line circuit 150 in the remote office 10 is operated to complete a loop therethrough over the toll line 250 to the toll line circuit 300 in the main exchange 20 and in response to the completion of the loop therebetween the toll line circuit 300 is operated to complete a loop therethrough over the trunk 460 to the toll selector 500 and to apply a potential to one of the control conductors of the trunk 460 extending to the toll selector 500, whereby the toll line circuit 150, the toll line 250 and the toll line circuit 300 are conditioned to repeat to the toll selector 500 in the main exchange 20 dialing impulses originating at the operator's position in the toll board 100 of the remote office 10 and the toll selector 500 is conditioned to respond to the dialing impulses in order to seize an idle one of a selected group of trunks.

Now assuming that the present call from the toll board 100 in the remote office 10 is to be extended via one of the group of combined local and toll connectors including the combined local and toll connector 600 to the subscriber station T1 in the main exchange 20, the operator at the toll board 100 operates the dial key of the cord circuit and dials the proper three digit number wherein the first digit indicates a route through an idle one of the group of combined local and toll connectors including the combined connector 600 and the second and third digits identify the line terminal before the combination connectors of the group associated with the subscriber line 263 extending to the called subscriber station. More particularly the operator at the toll board 100 operates the dial key K174 in the cord circuit 101 to close the first and third contact thereof whereby the dial mechanism 170 is connected across conductors C110 and C111 and a loop therethrough is completed via the second and fourth contacts of the ring key K173, the first and third contacts of the dial key K174 and the dial impulsing contacts 171. Thereafter, when the operator at the toll board 100 operates the dial mechanism 170 in order to dial the first digit, the dial off-normal spring is operated to close at contacts 172 a circuit for operating the dial relay R170 whereby the previously traced circuit for applying battery potential to the conductor C112 is interrupted at contacts 181. The removal of battery potential from the conductor C112 causes relay R210 to restore; whereby the previously traced loop from the upper and lower windings of the line relay R340 in the toll line circuit 300 extending via the toll line 250 through the lower winding of the control relay R230 is interrupted at contacts 213 and the current path through the upper winding of the control relay R230 is interrupted at contacts 215 and another loop from the upper and lower windings of the line relay R340 over the toll line 250 is completed at contacts 211 and 214 connecting the negative line conductor and the positive line conductor of the toll line 250 to the conductors C110 and C111, respectively, which as previously described are interconnected in a path including the dial impulsing contacts 171 in the cord circuit 101 of the toll board 100; whereby the line relay R340 in the toll line circuit 300 is retained operated. In the dialing of the first digit the release of the dial wheel causes the contacts 171 to interrupt the previously traced loop in accordance with the digit dialed and the line relay R340 in the toll line circuit 300 follows.

Each time the relay R340 restores and then reoperates it interrupts and then recompletes contacts 342, whereby relay R330 is retained operated during impulsing as it is of the slow to release type, and is completes and then interrupts contacts 343, whereby the dial relay is operated and retained operated during impulsing as it is of the slow to release type. Upon operating the relay R320 completes at contacts 321 a circuit for shunting the upper winding of the coil 361 whereby pulsing to the line relay R340 is improved, and opens contacts 322 to prevent the transfer relay R410 from being operated via contacts 421 during the dialing period. Also, each time the line relay R340 restores and then reoperates, it interrupts and then recompletes at contacts 341, the loop circuit extending between the winding of the loop relay R420 and the upper and lower windings of the line relay R530 in the toll selector 500, whereby the loop relay R420 is restored during the impulsing as it is of the slow to operate type and the line relay R530 follows the impulsing.

Each time the line relay R530 in the toll selector 500 restores and then reoperates, it interrupts and then recompletes at the contacts 531 the circuit for maintaining operated the hold relay R540; whereby the latter relay is retained in its operated position during impulsing as it is of the slow to release type. Also, each time the line relay R530 restores and then reoperates, it completes and then interrupts at contacts 532 a circuit further including the contacts 528, 541 and 553 for energizing the lower winding of the digit relay R570 and a multiple circuit for energizing the vertical magnet VM585, whereby the digit relay R570 is retained in its operated position during the first digit as it is of the slow to release type, and the vertical magnet VM585 is operated and restored in response to the impulsing in order to drive the wiper carriage of the Strowger mechanism 580 step by step in the vertical direction. When the wiper carriage of the Strowger mechanism 580 is driven one step in the vertical direction away from its normal vertical position, the vertical off-normal springs 566 are operated to complete at contacts 565 a circuit from ground potential for operating the off-normal relay R560, whereby the previously traced circuit for energizing the upper winding of the digit relay R570 is interrupted at contacts 561, and a further point in the previously traced circuit for operating the rotary magnet RM587 is completed at contacts 563.

At the conslusion of the dialing of the first digit the dial wheel of the dial mechanism 170 at the operator's position in the toll board 100 of the remote office 10, is returned to its normal position and the wiper carriage of the Strowger mechanism 580 of the toll selector 500 in the main exchange 20, is stepped vertically to the level of contact sets terminating the group of trunks including the trunk 690 having access to the group of combined local and toll connectors including the combination connector 600. Upon return of the dial wheel to its normal position, the off-normal spring is again operated to interrupt at contacts 172 the circuit for operating the dial relay R180, whereby the circuit is completed at contacts 181 for applying battery potential through the winding of relay R175 to the conductor C112. The restored relay R210 in the toll line circuit 150 is again operated in response to battery potential on the conductor C112, whereby the loop extending through the cord circuit 101 over the C110 and C111 conductors to the jack J105 is interrupted at contacts 211 and 214; and the aforementioned loop extending through the windings of the coil 223 and the lower winding of the control relay R230 and over the toll line 250 to the upper and lower windings of the line relay R340 in the toll line circuit 300 is again completed at contacts 213. In the toll line circuit 300, the line relay R340 and the hold relay R330 are maintained opearted and the dial relay R320 is restored shortly thereafter, it being of the slow to release type. The operated relay R340 maintaines completed at contacts 341 the previously tracted loop extending from the upper and lower windings of the line relay R530 in the toll selector 500 through the loop relay R420 in the toll line circuit 300 whereby the relay R530 is maintained operated and the loop relay R420 being of the slow to operate type operates a short time thereafter and before the dial relay R320 has restored, thereby preventing the transfer relay R410 from operating at this time. The operated line relay R530 in the toll selector 500 maintains the hold relay R540 operated at contacts 531 and interrupts, at the contacts 532, the previously traced path for energizing the lower winding of the digit relay R570 and the vertical magnet VM585, whereby the relay R570 is restored shortly thereafter, it being of the slow to release type. Upon restoring, the relay R570 completes at contacts 571 a circuit including the contacts 563, 588, 529, 512, 544 and 555 to ground potential, for energizing the rotary magnet RM587, whereby the wiper carriage of the Strowger mecahnism 580 is driven one step in the rotary direction away from its normal rotary position, and the mentioned path for energizing the rotary magnet RM587 is interrupted at contacts 588. At this time, the wipers of the Strowger mechanism 580 engage the contact set terminating the first trunk in the group including the trunk 690 extending to the group of combination connectors including the combination connector 600, and the test relay R510 tests the idle or busy condition of the first trunk mentioned.

Assuming that the first trunk is busy, battery potential does not appear upon the C2 control conductor thereof, the test relay R510, connected thereto via the C2 wiper of the Strowger mechanism 580, is not operated. The deenergized rotary magnet RM587 thereupon recompletes at contacts 588 the previously traced circuit for reoperating the rotary magnet RM587. Upon reoperating, the rotary magnet RM587 drives the wiper carriage of the Strowger mechanism 580 an additional step in the rotary direction, whereby the wipers of the Strowger mechanism 580 engage the contact set terminating the second trunk in the group including the trunk 690 extending to the group of combination connectors including the combination 600, the test relay R510 tests the idle or busy condition of the second trunk mentioned, and the path for energizing the magnet RM587 is interrupted at contacts 588. This interaction between the rotary magnet RM587, the contacts 588 and the test relay R510 continues until an idle trunk in the group mentioned is selected by the wiper set or until the wiper carriage of the Strowger mechanism 588 is driven eleven steps in the rotary direction away from its normal rotary position.

Now assuming that all of the trunks in the group mentioned are busy, the wiper carriage of the Strowger mechanism is driven in the manner as above described into its eleventh position, whereby the cam springs 546 are closed to complete at contacts 545 a circuit including the C2 conductor of the trunk 460 and grounded contacts 331 for operating the busy relay R550. Upon operating, the busy relay R550 opens at contacts 555 the previously traced circuit for operating the rotary magnet RM587 and interrupts at contacts 551 the previously mentioned loop extending between the upper and lower windings of the line relay R530 through the windings of the repeater coil 363 and the loop relay R420 in the toll line circuit 300. Thereupon the loop relay R420 and the line relay R530 are restored. In the toll line circuit 300, the loop relay R420 completes at contacts 421 a circuit including contacts 333 and 322 for operating the transfer relay R410, whereby the hold circuit thereto is completed at contacts 414 and the loop relay R420 is disconnected from the windings of the coil 363 at contacts 412 and the upper and lower windings of the control relay R430 are connected to the upper and lower windings of the repeater coil 363 at the contacts 411 and 413, respectively.

In addition, the transfer relay R410, upon operating, completes at contacts 415 a circuit including contacts 432, 421, 322 and 333 for operating the supervisory relay R310 and closes contacts 414 for maintaining a multiple hold circuit to the transfer relay R410 and the supervisory relay R310. Upon operating, the supervisory relay opens contacts 312 and 314 and closes contacts 311 and 313 connecting the conductors of the toll line 250 to the upper and lower windings of the line relay R340 in the toll line circuit 300, whereby the polarity of the conductors of the toll line 250 is reversed. The reversal of polarity of the conductors of toll line 250 reverses the direction of current flow through the previously traced loop path extending between the toll line circuit 150 and the toll line circuit 300, whereby the direction of the current through the lower winding of the differential relay R230 is reversed and the latter relay is operated. Upon operating, the relay R230 closes at contacts 231, a path for shunting the resistor 235, whereby the lower winding of the control relay R230 is made more sensitive to changes in current flow through the loop and hence more easily maintained and restored. In addition, the control relay R230 closes at contacts 232, a circuit including contacts 131 and 246 for operating the hold relay R240, whereby a hold circuit therefore is completed at contacts 245. The relay R240 closes at contacts 244 a circuit from battery potential through the resistor 236 for maintaining the relay R210 operated and interrupts at contacts 243 the connection through the relay R210 to battery potential on the control conductor C112, and, at the same time completes at contacts 247 and 248 a circuit including contacts 233 extending from ground potential to the conductor C112 and thereover through the sleeve of the plug P103 and the winding of the supervisory relay R175 in the cord circuit 101 to battery potential at contacts 181, whereby the latter relay is operated. The relay R175 upon operating completes at contacts 176 a circuit for illuminating the supervisory lamp 177 to render busy supervision to the operator at the toll board 100.

At the same time that the busy relay R550 opens contact 551 to operate the toll line circuit 150 in the manner above described to give busy supervision to the operator at the toll board 100, the busy relay R550 closes at contacts 552, a circuit for extending a busy signal via contacts 521, the trunk 460, and contacts 451 and 341 to the repeater coil 360. Specifically, and assuming that the busy signal comprises a busy tone applied at the rate of 120 impulses per minute, the busy signal path includes capacitor 564, contacts 552 and 521, the negative line conductor of the trunk 460, contacts 451 and 341, the upper winding of the coil 363 in the repeater coil 360, the capacitor 364, the lower winding of the coil 363 in the repeater coil 360, contacts 457, the positive line conductor of the trunk 460, contacts 451, 523 and the lower winding of relay R530 to ground potential. The busy tone is repeated via the coil 361 in the repeater coil 360 over the toll line 250 to the toll line circuit 150 and therein repeated via the repeater coil 220 over the control conductors C110 and C111 to the cord circuit 101 and to the operator's head set 178 thereof, whereby the operator at the toll board 100 is signalled by the 120 I. P. M. busy tone that all of the trunks in the group including the trunk 690 extending to the group of combination connectors including the combination connector 600 are busy.

Again considering the busy signal from the toll selector 500 and assuming that the busy signal applied at the contacts 552 by the busy relay R550 is of the flash type comprising ground potential applied at the rate of 120 impulses per minute, the flash busy signal is transmitted over a path including contacts 521, the negative line conductor of the trunk 460, contacts 451 and 341, the upper winding of the coil 363, contacts 411 and the upper winding of the control relay R430, in the toll line circuit 300, to battery potential, whereby the latter relay follows the pulsing and is operated and restored at the rate of 120 times per minute. Each time the relay R430 operates and restores it interrupts and then recompletes at contacts 432 the circuit of operating the supervisory relay R310, whereby the latter relay follows. Responsive thereto, the supervisory relay R310 reverses the polarity on the toll line 250 at the rate of 120 times per minute, whereby the control relay R230 in the toll line circuit 150 is caused to operate and restore at the rate of 120 times per minute. Responsive to the operation and restoration of the control relay R230, the contacts 233 are opened and closed at the rate of 120 times per minute, whereby the supervisory lamp 177 at the operator's position in the toll board 100, is operated over the previously traced path at the rate of 120 times per minute, thereby indicating to the operator that all of the mentioned trunks accessible from the toll selector 500 are busy. In another alternative and as illustrated in Fig. 5, the busy signal may comprise both busy tone and flash busy applied over the respectively traced paths, whereby the operator at the toll board 100 is rendered a visual and an audio all trunks busy signal. In response to either or both of the all trunks busy signal at the toll board 100, the operator thereat prepares to abandon the call to release the operated equipment.

In order to release the operated equipment the operator at the toll board 100 withdraws the plug P103 of the cord circuit 101 from the jack J105, thereby removing at contacts 114 the operating ground potential to the seize relay R130. The relay R130 restores immediately when busy tone is employed, though some delay may be experienced when flash busy is employed inasmuch as the line relay may be held operated over a path from ground potential including contacts 248, 234 and 132 during the interval during flashing when the control relay is restored. The relay R130 opens at contacts 131 the circuit for maintaining the relays R210 and R240 operated. Upon restoring, the relay R210 opens at contacts 213 the loop from the upper and lower winding of the line relay R340 in the line circuit 300 through the lower winding of the control relay R230 in the toll line circuit 150 and opens at contacts 215 the current path through the upper winding of the relay R230 whereby relays R230 and R340 are resored. In the toll line circuit 300, the relay R340 interrupts at contacts 341 the previously traced path from the source of busy signal in the toll selector 500 to the repeater coils 360 and the control relay R430 therein, whereby, when flash busy is used, the relay R340 is restored, and interrupts at contacts 342 the circuit for operating the relay R330, whereby a short time thereafter the latter relay restores. Upon restoring, the relay R330 removes at contacts 333 ground potential for operating the transfer relay R410 and the supervisory relay R310, and opens at contacts 331, the circuit for extending ground potential via the C2 conductor of the trunk line 460 to the busy relay R550 in the toll selector 500, whereby relays R310, R410 and R550 are restored.

In the toll selector 500, the busy relay R550 completes at contacts 554 a circuit from ground potential including contacts 528, 532, 542 and 562 for operating the release magnet RL586, whereby the wiper carriage of the Strowger mechanism 580 is restored to its normal vertical and rotary positions causing the vertical off-normal spring 566 to be operated to open contacts 565 for restoring the off-normal relay R560. At this time all of the relay groups in the toll line circuit 150, the toll line circuit 300 and the toll selector 500 are in their restored positions and the busy lamps L106, etc., associated with the jacks J105, etc., terminated in the toll line circuit 150 are extinguished in order to indicate to the operator at the toll board 100 that the established connection therefrom to the toll selector 500 is released and that all of the apparatus involved therein including the toll line 250 is idle and available for further use.

Reconsidering the operation of the toll selector 500 in the main exchange 20 in response to the dialing of the first digit at the toll board 100 in the remote office 10, and considering in particular the operation of the test relay R510 and the rotary magnet RM587 therein to find an idle trunk in the group of trunks including the trunk 690, the wiper carriage of the Strowger mechanism 580, as previously explained, is rotated step by step over the contacts terminating the trunks until an idle trunk in the group mentioned is selected by the wiper set or until the wiper carriage of the Strowger mechanism 580 is driven eleven steps in the rotary direction away from its normal rotary position. Now assuming that there is an idle trunk in the group and that the trunk 690 extending to the combined local and toll connector 600 is the first idle trunk available to the wiper set, the C2 conductor of the trunk 690 has battery potential applied thereto from the combined connector 600, in a manner as previously explained. The wiper set of the Strowger mechanism 580, upon selecting the contact set terminating the trunk 690 completes at the C2 wiper thereof a circuit including contacts 543 for energizing the winding of the test relay R510; whereupon the latter relay operates to complete at contacts 511 a circuit including the contacts 544 and 555 for operating the hold relay R520. Also the test relay 510 interrupts at contacts 512 a point in the circuit for operating the rotary magnet RM587, whereby operation of the wiper set of the Strowger mechanism 580 is arrested at this time. The hold relay R520 upon operating interrupts at contacts 529, a further point in the circuit for operating the rotary magnet RM587 and closes contacts 522, 524, 525 and 526 to connect, respectively, the negative line conductor, the positive line conductor, the C1 conductor and the C2 conductor of the trunk 460 through the toll selector 500 and the corresponding wipers of the Strowger mechanism 580 thereof to the corresponding conductors of the trunk 690. Also the hold relay R520 interrupts at contacts 521 and 523, the connection between the line relay R530 and the trunk 460 and completes at contacts 527, a hold circuit therefor from ground potential on the C2 conductor of the trunk 460. Thereafter the relays R510, R530 and R540 are restored in the toll selector 500. Upon connection of the trunk 460 through to the trunk 690, a loop is completed over the negative and positive lines thereof from the upper and lower windings of the line relay R620 in the combination connector 600 through to the loop relay R420 in the toll line circuit 300 and ground potential on the C2 conductor of the trunk 460 is extended over the C2 conductor of the trunk 690 and via contacts 661 and 642 through the upper winding of the vertical digit relay R670 to battery potential, whereby the relays R620 and R670 in the combination connector 600 are operated and the relay R420 in the toll line circuit 300 is operated shortly thereafter, the latter being of the slow to operate type. Specifically, the loop circuit including the upper and lower winding of the line relay R620 extends from battery potential via the upper winding thereof, contacts 611 and 711, the negative line conductor of the trunk 690, the negative line wiper of the Strowger mechanism 580 and contacts 522 of the toll selector 500, the negative line conductor of the trunk 460, contacts 451 and 341, the upper winding of the coil 363, the winding of relay R420, contacts 412, the lower winding of the coil 363, contacts 457, the positive line conductor of trunk 460, contacts 524 and the positive line wiper of the Strowger mechanism 580 of the toll selector 500, the positive line conductor of the trunk 690, contacts 715 and 613 and the lower winding of the relay R620 to ground potential. As previously explained the operation of relay R420 in the toll line circuit 300 prevents the transfer relay R410 therein from operating at this time. Additionally, and as explained in Sec. 3 thereof, the line relay R620 operates the hold relay R630 and the release relay R640 operates to remove battery potential from the C2 conductor of the trunk 690, and to apply ground potential to the C3 conductor of the trunk 275, whereby the trunks 690 and 275 are marked as busy to the selectors having access thereto; R640 also operates at 641 to complete a hold circuit for the upper winding of relay R670; and to prepare a hold circuit for the lower winding of the relay R670 and a multiple circuit for operating the vertical magnet VM680. The vertical digit relay R670 completes at contacts 672 a further point in the above mentioned hold circuit to the lower winding thereof and the above mentioned multiple circuit to the magnet VM680, and completes at contacts 671 a circuit from ground potential on the C1 conductor of the trunk 690 for operating the ring cut off relay R720. Upon operating, the relay R720 completes at contacts 726 a multiple hold circuit to the upper winding thereof and, as explained in Section 3 hereof, opens contacts 721 and 724 for interrupting the ringing generator circuit and closes at contacts 722 and 725 two points in a connection between the line wipers of the Strowger mechanism 780 and the line conductors of the trunk 690, which connection is incomplete at this time. The cord circuit 101 of the toll board 100 in the remote office 10, at this time, is connected via the toll line circuit 150, the toll line 250, the toll line circuit 300 of the main exchange 20, the trunk 460, through the toll selector 500 and the trunk 690 to the combined local and toll connector 600 in the main exchange 20, and the combination connector 600 is prepared to receive the digits designating the contact set before the wipers of the Strowger mechanism 780 thereof that terminate the called subscriber line.

The operator at the toll board 100 then dials the second and third digits; whereby the dialing impulses thereof are repeated over the above traced connection to the combination connector 600. During the dialing of the second digit, the toll line circuit 150 in the remote office 10 is operated in a manner as previously explained to cause the line relay R340 in the toll line circuit 300 to follow the dialing impulses. As previously explained, the restoring and reoperating of the line relay R340 opens and closes contacts 341, whereby the previously traced loop from the loop relay R420 through the upper and lower winding of the line relay R620 is interrupted causing the line relay R620 to follow the dial impulses of the second digit. In the combined local and toll connector 600, the restoring and reoperating of the line relay R620 energizes the vertical magnet VM680, whereby the wiper set of the Strowger mechanism 780 is caused to move step by step in a vertical direction away from its normal vertical position to the vertical level of contact sets including the contact set terminating the called subscriber line. At the end of the dialing of the second digit, the toll line circuits 150 and 300 are again operated in a manner previously described to maintain the relay R620 in the combination connector 600 operated. The relay R660 is operated and the vertical digit relay R670 restores shortly thereafter thereby preparing at contacts 673 one point in a circuit for operating the rotary digit relay R740 and the rotary magnet RM785. Upon dialing of the third digit by the operator at the toll board 100, the toll line circuits 150 and 300 are operated to repeat the dialing impulses to the line relay R620, whereby the rotary digit relay R740 is operated during the impulsing period thereof, causing the control relay R750 to operate and the rotary magnet RM785 follows the dial impulsing, whereby the wiper set of the Strowger mechanism 780 is stepped in a rotary direction away from the normal position to select the contact set terminating the subscriber line 263 extending to the called subscriber station T1, and the test relay R730 is prepared to test for the idle or busy condition of the called subscriber line. The subsequent operation of the combination connector 600 depends upon the idle or busy condition of the called subscriber station T1 at this time.

First assuming that the called subscriber station T1 is busy at this time, the combination connector 600 switches through to the subscriber line 263 and finds ground potential applied to the control conductor thereof by the line circuit 267, whereby the busy relay R730 is operated. Shortly thereafter the relays R740 and R750 are restored in a manner as previously described, whereby a circuit from ground potential on the C2 conductor of the trunk line 690 and including contacts 732 and 751 is completed for operating the toll switching relay R710. The latter relay interrupts at contacts 711 and 715 the previously traced loop extending from the upper and lower windings of the line relay R620 via the trunk 620, the toll selector 500 and the trunk 460 through the winding of the loop relay R420 in the toll line circuit 300; whereby the relays R420 and R620 restore, causing the transfer relay R410 in the toll line circuit 300 to operate and causing the relays R630 and R640 in the combination connector 600 to restore. Further, the toll switching relay R710, upon operating completes at contacts 714 a circuit extending from the source of busy signal and including contacts 731 and 712, the negative line conductor of the trunk 690, the negative line wiper of the Strowger mechanism 580 and contacts 522 of the toll selector 500, the negative line conductor of the trunk 460, contacts 451 and 341, the upper winding of the coil 363, contacts 411 and the upper winding of the relay R340 to battery potential for applying thereto a flash busy signal comprising 60 ground potential impulses per minute, whereby the control relay R430 in the toll line circuit 300 follows. The operation and release of the relay R430 together with the relay R310 reverses the polarity of the conductors of the toll line 250 and operates the relay group in the toll line circuit 150 in a manner as previously explained so as to cause the supervisory lamp 177 at the operator's position in the toll board 100 to flash at the rate of 60 times a minute, thereby indicating to the operator at the toll board 100 that the called subscriber station T1 is busy at this time. The busy signal applied at the contacts 714 may also be made to include, in addition to flash busy, a busy tone interrupted at the rate of 60 times per minute by utilizing a strapping conductor 707, as shown in Fig. 7, to extend the busy tone applied through the capacitor 708 to the contacts 731. The busy tone is then applied over the above traced path to the upper winding of the coil 363 and thence through the capacitor 364, the lower winding of the coil 363, contacts 457, the positive line conductor of the trunk 460, and contacts 523 and the lower winding of the relay R530 in the toll selector 500 to ground potential, whereby the busy tone is repeated in a manner as previously explained at the repeater coil 360 in the toll line circuit 300 over the toll line 250 to the repeater coil 220 in the toll line circuit 150 and therefrom over the trunk 102 to the operator's headset 178 associated with the cord circuit 101 in the toll board 100. The operator thereat is in this case provided with both an audio and visual busy signal to indicate that the called subscriber station T1 is busy. Thereafter, the operator at the toll board 100 in the remote office 10 withdraws the plug P103 from the jack J105 in order to bring about the release of the apparatus involved in the connection to the busy subscriber line 263 in the main exchange 20.

Upon withdrawal of the plug P103 from the jack J105, the operated relays R130, R210, R230 and R240 in the toll line circuit 150 and the operated relays R310, R330, R340, R410, R430 and R440 in the toll line circuit 300 are restored and ground potential is removed from the C2 conductor of the trunk 460 in a manner as previously explained. The removal of ground potential from the C2 conductor of trunk 460 causes the hold relay R520 in the toll selector 500 to restore whereby the connections through the toll selector 500 from the conductors of the trunk 460 to the trunk 690 are interrupted by the opening of contacts 522, 524, 525 and 526 and by the release magnet RL586 being operated to restore the wiper carriage of the Strowger mechanism 580 to its normal rotary and vertical positions. Thereafter the off-normal relay R560 is restored whereby the toll selector 500 is again rendered idle and available for further use. The release of the trunk 690 by the toll selector 500 interrupts the operating circuits to the toll switching relay R710 and to the ring cut off relay R720 whereby the relays R710, R720 and R730 are restored and the release magnet RL786 is operated to restore the wiper carriage of the Strowger mechanism 780 in its normal vertical and rotary positions causing the relay R660 to restore. At this time the established connection between the calling toll board 100 in the remote office 10 and the busy called subscriber line 263 in the main exchange 20 is released and all of the apparatus involved therein is completely released and available for further use.

Now assuming that the called subscriber station T1 is idle at this time, the combination connector 600 at the control wiper C thereof in the wiper set of the Strowger mechanism 780, completes a connection to the control conductor 263C of the subscriber line 263 associated with the subscriber station T1; wherein the line circuit 267, responsive to the idle condition of the subscriber line, applies battery potential to the control conductor 263C. Shortly thereafter the deenergized rotary digit relay R740 restores and is followed by the control relay R750, whereby there is closed at contacts 754 a circuit including the upper winding of the switch through relay R760, contacts 735 and contacts 646 from battery potential on the control connector 263C to ground potential. The relay R760 is energized and operated, thereby closing at contacts 767 a previously traced hold circuit, and closing at contacts 764, a circuit from ground potential on the C2 conductor of the trunk line 690 for operating the toll switching relay 710. In addition relay R760 closes at contacts 762 and 763 and relay R710 prepares at contacts 712 and 716 an open loop extending from the subscriber station T1 via the line conductors 263A and 263B of the subscriber line 263, the line wipers of the Strowger mechanism 780, the trunk line 690, the line wipers of the Strowger mechanism 580 of the toll selector 500 and the trunk 460 through the loop relay R420 in the toll line circuit 300, whereby the latter relay is restored and the transfer relay R410 therein is operated. In addition relay R760 completes at contacts 761 a circuit including the capacitor 781, contacts 723 and 712 and the previously traced busy tone circuit via the negative line conductor of the trunk 690 for returning ring back tone to the operator at the toll board 100. At the same time the toll switching relay R710 interrupts at contacts 711 and 715, the previously traced loop extending to the upper and lower windings of the line relay R620 in the combination connector 600, whereby the relay R620 is restored, and the relays R630 and R640 are restored a short time thereafter, in a manner as previously described. In addition, the toll switching relay R710 closes at contacts 718 a circuit for applying ground potential to the lower winding of the switch through relay R760, whereby the latter relay is retained operated even after relay R640 is restored, and closes at contacts 717B a circuit for applying toll ringing generator and battery potential to the lower winding of the ring cut off relay R720. At this time the combination connector 600 is connected through to the idle called subscriber line 263, and the control conductor 263C thereof has ground potential applied thereto to prevent other connectors having access thereto from seizing the line, and the called subscriber station T1 is available for ringing.

Recapitulating, it is recalled that at the time the toll connector 600 seized the idle subscriber line 263, the toll line circuit 150 in the remote office 10 had operated therein relays R130 and R210 and the toll line circuit 300 in the main exchange 20 had operated therein relays R330, R340 and R420. As previously mentioned, upon seizure of the subscriber line 263, an open loop is extended from the called subscriber station T1 through the winding of the loop relay R420 in the toll line circuit 300, whereby the latter relay is restored and the transfer relay R410 is operated. Upon operating, the transfer relay R410 interrupts at contacts 412 the previously mentioned open loop through the relay R420 and connects into the open loop at contacts 411 and 413, and in place of the winding of the relay R420, the upper and lower windings of the control relay R430 terminated respectively at battery and ground potential; and in addition closes at contacts 415, a previously traced circuit for operating the supervisory relay R310, whereby the polarity of the conductors in the toll line 250 is reversed, the relays R230 and R240 in the toll line circuit 150 are operated and the supervisory lamp 177 at the operator's position in the toll board 100 in the remote office 10 is lighted, in a manner as previously described, to provide the operator thereat with ringing supervision. In response to ringing supervision the operator at the toll board 100 closes and then opens the first and third contacts of the ringing key 173 in the cord circuit 101, thereby completing a loop from battery via the ring and tip of the plug P103, the ring and tip of the jack J105, the conductors C110 and C111 of the trunk 102 and the winding of the manual ring relay R140, whereby the latter relay is energized and operated. Upon operating, the relay R140 closes at contacts 141 and 142 circuits for shunting the lower winding of the line relay R340 and the ringing relay R350 in the toll line circuit 300 and for maintaining the line relay R340 operated through the upper winding thereof; whereby the ringing relay R350 therein is operated by energization of only its upper winding. Relay R230 in the toll line circuit 150 is maintained operated over its upper winding. Specifically, a circuit is closed from ground potential at contacts 141 extending via contacts 241, the negative line conductor of the toll line 250, contacts 313, the lower winding of the coil 361, the lower winding of the relay R350 and the lower winding of the relay R340 to ground potential, whereby the current flow in this path is interrupted; and a circuit is closed from ground potential at contacts 142 extending via contacts 242, 213, the positive line conductor of the toll line 250, contacts 311, the upper winding of the coil 361, the upper winding of the ringing relay R350 and the upper winding of the line relay R340 to battery potential, whereby the line relay R340 is retained operated through the upper winding thereof and the ringing relay R350 is operated inasmuch as it is of the differential type. At the same time, the operation of relay R140 shunts the current flow through the lower winding of the operated control relay R230 in a path from ground potential via contacts 141, 241, the upper winding of the coil 223, the lower winding of the relay R230, contacts 231, the lower winding of the coil 233, contacts 242 and 142 to ground potential, whereby the current flow through the lower winding of the control relay R230 is halted and the relay R230 is retained operated at the upper winding thereon inasmuch as it is of the polar type. The ringing relay R350 in the toll line circuit 300, upon operating, closes at contacts 351 an obvious circuit for operating the ringing transfer relay R450, whereby the contacts 455 are opened to remove ground potential from the C1 conductor of the trunk line 460 which causes the ring cutoff relay R720 in the combination connector 600 to restore. Upon restoring the ring cutoff relay R720 interrupts at contacts 726 the circuit for energizing the upper winding there so that the relay R720 remains restored even after the operator at the toll board 100 has opened the ringing key and relays R140, R350 and R450 have restored; and relay R720 completes at contacts 721 and 724 a previously traced ringing loop through the ringing apparatus of the subscriber station T1. Thereupon the subscriber station T1 is rung by the toll generator; and the ring cutoff relay R720 remains restored inasmuch as the loop through the ringing apparatus permits a flow of ringing current only.

When the call is answered at the called subscriber station T1, a direct current loop is completed at the called subscriber station over the previously traced circuit, whereby the relay R720 is energized from battery potential through the lower winding thereof and operated. The relay R720 interrupts at contacts 721 and 724 ringing loop to the subscriber station T1 and completes at contacts 722 and 725 a loop through the subscriber station T1 extending over the previously traced paths to the upper and lower windings of the control relay R430 in the toll line circuit 300. Thereupon the relay R430 is operated to interrupt at contacts 432 the previously traced circuit for operating the supervisory relay R310, and to complete at contacts 431 a circuit from ground potential via contacts 333 and 414 for operating a line hold relay R440. When the supervisory relay R310 is restored, the toll line circuit 150 is operated in a manner as previously explained to extinguish the supervisory lamp 177 in the toll board 100, whereby the operator thereat is provided with answering supervision; whereupon the operator may complete a talking connection to the party at the called subscriber station T1. At the same time, the relay R440 upon operating completes at contacts 443 a circuit for applying the multiple ground to the C1 conductor of the trunk line 460 and completes at contacts 442 a circuit including the resistor 416 for partially shunting the upper and lower windings of the line relay R340, whereby the D. C. current flow through the talking loop of the toll trunk circuit 150 is reduced to improve the talking transmission qualities thereof. At this time a connection is established between the operator at the calling toll board 100 in the remote office 10 and the called subscriber station T1 in the main exchange 20 via the toll line circuit 150, the toll line 250, the toll line circuit 300, the trunk 460, the toll selector 500, the trunk 690, the combined local and toll connector 600 and the subscriber line 263. The operator at the calling toll board 100 then advises the subscriber at the called subscriber station T1 that there is a toll call for him and completes the connection to the calling circuit and then retires from the established connection.

In order to facilitate the completion of the connection to the calling circuit the toll line circuit 150 includes facilities for permitting the operator at the toll board 100 to remove the calling cord from the connection and replace it with another cord, for example, a patching cord, without interrupting the completed connection between the toll board and the subscriber station T1. Specifically, the operated line relay R130 is retained operated, notwithstanding the removal of the plug P103 from the jack J105, inasmuch as the energizing circuit thereto is completed from ground potential via contacts 248, 234 and 132 and the relay R210 is retained operated from ground potential via contacts 131, the winding thereof, contacts 244 and resistor 236 to battery potential. Thereafter, when the operator inserts the plug of the patching cord in the jack J105, ground potential is again applied to the seize relay R130 at contacts 114.

Assuming that a cord circuit including the supervisory facilities of the cord circuit 101 is utilized to complete the established toll connection to the calling subscriber circuit; the subscriber at the called subscriber station T1 may render switch hook supervision to the operator at the calling toll board 100 by operating the associated switch hook, whereby the control relay R430 in the toll line circuit 300 follows. Each time the control relay R430 restores and then reoperates, it completes and then interrupts at contacts 432, the previously traced circuit for operating the supervisory relay R310; and each time the supervisory relay R310 operates it reverses at contacts 311 and 313 the polarity of the conductors of the toll line 250, whereupon the polar control relay R230 in the toll line circuit 150 follows. As the polar control relay R230 follows, the supervisory lamp 177 in the cord circuit in use is flashed rendering switch hook supervision to the operator at the toll board 100. The operator at the toll board 100 may then reenter the connection and converse with the subscriber at the called subscriber station T1.

At the conclusion of the established connection when the subscriber at the called subscriber station T1 disconnects, the loop circuit extending therefrom to the upper and lower windings of the control relay R430 in the toll line circuit 300 is interrupted; whereupon the latter relay restores to interrupt at contacts 431 the previously traced circuit for operating the line hold relay R440 and completes at contacts 432 a circuit for operating the supervisory relay R310, whereby the toll line circuit 150 is operated to light the supervisory lamp 177 at the operator's position in the toll board 100 in order to provide the operator thereat with disconnect supervision.

Should the operator at the toll board 100 at this time desire to re-ring the subscriber at the called subscriber station T1, the ring key K173 in the cord circuit 101 is operated to complete then interrupt at the first and third contacts thereof the previously traced circuit for energizing the manual ring relay R140. Thereupon the relay R140 is operated to shunt the lower windings of the line relay R340 and the ringing relay R350 in the toll line circuit 300, in a manner as previously described, whereby the latter relay is operated. Upon operating, the ringing relay R350 closes at contacts 351 a circuit for operating the ringing transfer relay R450 in order to interrupt at contacts 455 the ground potential applied to the C1 conductor of the trunk line 460 which is extended through the toll selector 500 to the C1 conductor of the trunk line 690 and thereover to the ring cutoff relay R720, whereby the relay R720 is restored and the ringing loop to the called subscriber station T1 is recompleted. In response to the ringing at the called subscriber station T1, the subscriber thereat answers, causing the ring cutoff relay R720 to operate whereby the connection between the operator's position in the toll board 100 and the subscriber at the subscriber station T1 is recompleted and the operator at the toll board 100 is free to converse with the subscriber at the called station T1.

After the established connection is completed and the subscriber at the called subscriber station T1 has disconnected thereby rendering the operator at the toll board 100 disconnect supervision, the operator may release the established connection by withdrawing the plug P103 from the jack J105, whereby the operated relays in the relay groups of the toll line circuits 150 and 300 are restored, the toll selector 500 is rendered idle and the trunk 690 released. In the combined local and toll connector 600, the toll switching relay R710, the ring cutoff relay R720 and the connecting relay R760 are restored, whereby the release magnet RL786 is operated to restore the wiper set of the Strowger mechanism 780 to its normal vertical and rotary position, thereby causing the relay R660 to restore and apply battery potential through the upper winding of the vertical digit relay R670 to the C2 conductors of the trunk 690 and the C3 conductor of the trunk 275 in order to mark the trunks as idle to the toll selector 500, etc., and to the finder selector link 270, etc., having access thereto. When the connector 600 is thus released, the line circuit 267 associated with the subscriber line 263 is operated in order to apply battery potential to the control conductor 263C thereof in order to mark the subscriber line as idle to the connectors having access thereto. At this time, the established connection between the calling toll board 100 and the called subscriber station T1 is released and all of the apparatus involved therein is completely released and available for further use.

Reconsidering the extension of the connection from the calling toll board 100 in the remote office 10 to the called subscriber station T1 in the main exchange 20, the operator at the toll board 100 has available by means of the jack J107 terminated in the toll line circuit 150 automatic ringing facilities, whereby upon seizure of the idle called subscriber line 263, the toll line circuit 150 is operated to automatically cause the called subscriber station T1 to be rung. Specifically, when the operator at the toll board 100 in calling the subscriber station T1 inserts the plug P103 in the jack J107, a circuit is completed from ground potential at contacts 115 over the conductor C114 of the trunk 102 through the automatic ring relay R120 and the seizure relay R130 to battery potential, whereby both of the relays are operated. The seizure relay R130 operates in a manner as previously explained, and the automatic ring relay R120 prepares at contacts 121 and 122, a circuit for applying ground potential to both conductors of the toll line 250 in the same manner as did the operated manual ring relay R410. These circuits prepared by the relay R120 are incomplete at this time at contacts 241 and 242. As mentioned previously, the contacts 241 and 242 are closed when relay R240 is operated in response to either a flash busy signal or a seizure signal being returned to the toll line circuit 150 to cause operation of the control relay R230. In response to the operation of the hold relay R240 ground potential is applied to both conductors of the toll line 250, whereby the ringing relay R350 and the ringing transfer relay R450 are operated. In the event that the signal causing operation of the hold relay R240 is a seizure signal, the resulting operation of the ringing transfer relay R450 causes the interruption at contacts 455 of a previously traced circuit for maintaining the ring cutoff relay R720 in the combined local and toll connector 600 operated, whereby the called subscriber station T1 is rung. In the event that the signal causing operation of the hold relay R240 is a flash busy signal, the resulting operation of the ringing transfer relay R450 is of no consequence inasmuch as the relay R720 is not operated at this time. In addition to completing the circuits for applying ground potential to both conductors of the toll line 250, relay R240 upon operating completes at contacts 249, a circuit for shunting the winding of the automatic ring relay R120, whereby the relay R120 is restored after the above described ringing operation has taken place, without affecting the operation of the seizure relay R130. Upon restoring the relay R120 interrupts at contacts 121 and 122, the previously traced circuits for applying ground potential to the conductors of the conductor pair 250, whereby the relays R350 and R450 are restored and ground potential is reapplied at contacts 455 to the C1 conductor of the trunk line 460 and the trunk line 690 for holding the ring cutoff relay R720 operated when the call is answered at the called subscriber station T1. At the conclusion of an established connection when the subscriber at the called subscriber station T1 disconnects, the operator at the toll board may recall the subscriber at the called subscriber station T1 by operating the ring key 173 in the cord circuit 101 in a manner as previously described, whereby, in this instance, the manual ring relay R140 is operated to cause ringing of the subscriber station T1.

Release of the established connection by the operator at the toll board 100 is accomplished at the jack J107 by withdrawal of the plug P103 therefrom whereupon the relay groups in the toll line circuit 150, the toll line circuit 300, the toll selector 500 and the combination connector 600 are restored in a manner as previously explained and all of the apparatus involved therein is completely released and available for further use.

*Section 5.—Call extended from the toll board in the remote office to the P. B. X board in the main exchange*

Again assume that a call is initiated by the operator at the toll board 100 in the remote office 10 and that the toll selector 500 in the main exchange 20 is again seized via the toll line circuit 150, the toll line 250, the toll line circuit 300 and the trunk 460, in the manner as explained in Section 4. Now assuming that the present call is to be extended in the main exchange 20 from the toll selector 500 to the P. B. X board 260 through the combined local and toll connector 600, the operator at the toll board 100 dials a three digit number; the first digit indicating the route mentioned and the second and third digits identifying the contact set before the wiper set of the combination connector 600 terminating the P. B. X trunk line 261, extending to the called P. B. X board 260. The dialing impulses of the first digit are repeated to the toll selector 500 in the manner previously explained; whereby the wiper carriage of the Strowger mechanism 580 is driven a corresponding number of steps in the vertical direction to the level of contact sets terminating the group of trunks including the trunk 690. Shortly following the first digit, the off-normal relay R560 operates in a manner as previously explained to cause the wiper carriage of the Strowger mechanism 580 to be driven in the rotary direction over the contact sets terminating the trunks 690, etc., extending to the group of combined local and toll connectors 600, etc., in order to engage an idle one of the trunks. Assuming that the trunk 690 is one of the trunks in the group marked as idle by the corresponding combination connector 600, the toll selector 500 completes a connection thereover to the combination connector 600 in a manner as previously explained. Thereupon, at the conclusion of the first digit the trunk 460 terminated in the toll circuit 300 is switched through the toll selector 500 and over the trunk line 690 to the combined connector 600, wherein the line relay R620, the hold relay R630, the release relay R640, the vertical digit relay R670 and the ring cutoff relay R720 are operated and a circuit is prepared for operating the vertical magnet VM680 in a manner as described in Section 4. The dialing impulses of the second digit are repeated to the combination connector 600 in the manner previously explained, whereby the wiper carriage of the Strowger mechanism 780 is driven a corresponding number of steps in the vertical direction to the level of contact sets including the contact set terminating the P. B. X trunk line 261. Shortly following the second digit, the vertical digit relay R670 is restored and the start relay R660 is operated to prepare a circuit for operating the rotary magnet RM785, whereby the latter magnet is operated in response to the dialing impulses of the third digit to drive the wiper carriage of the Strowger mechanism in the rotary direction to engage the contact set terminating the P. B. X trunk line 261. Responsive to the busy condition of the trunk line 261, the test relay R730 and the toll switching relay R710 are operated to cause a busy signal to be returned from the combination connector 600 to the operator's position at the toll board 100 in the remote exchange 10, whereby the operator thereat may interrupt the connection to the P. B. X trunk line 261 and release all of the apparatus involved therein.

Assuming that the P. B. X trunk line 261 is idle, the P. B. X trunk line 261 is seized and the connecting relay R760 and the toll switching relay R710 are operated, whereby the operator at the toll board 100 is signalled that the trunk line 261 extending to the called P. B. X board 260 has been seized. If the operator is, at this time, utilizing the automatic ringing facilities of the toll line circuit 150, the P. B. X board 260 is automatically rung, or if the operator is utilizing the delayed ringing facilities of the toll line circuit 150, the board 260 is rung by the operator at the toll board 100 manipulating the ringing key K173 in the cord circuit 101 in a manner as previously explained. Thereupon, the operator at P. B. X board 260 is rung and in response thereto answers the call and completes the connection to the desired telephone line. Assuming that in completing the connection to the desired telephone line, the P. B. X operator sets up a blocked supervision condition at the P. B. X board 260, the operator at the toll board 100 does not receive disconnect supervision when the subscriber on the telephone line extending from the P. B. X board 260 disconnects inasmuch as the calling loop is still completed at the P. B. X board 260. However, if in response to monitoring of the call the operator at the toll board 100 determines that the called party on the telephone line extended from the P. B. X board 260 has disconnected, the operator at the toll board 100 is free to recall the operator at the P. B. X board 260 in order to complete, for example, a call to another telephone station served from the P. B. X board 260.

Considering the recall of the operator at the P. B. X board 260 in the main exchange 20 by the operator at the toll board 100 in the remote office 10, when the party at the called telephone station served therefrom disconnects, the established connection from the toll board 100 to the P. B. X board 260 remains completed, whereby in the toll line circuit 300, the previously operated relays R410, R430 and R440 are retained operated. Thereafter, when the operator at the toll board 100 operates in the cord circuit 101 the ringing key K173 to close the first and third contacts thereof, the manual ring relay R140 in the toll line circuit 150 is operated in a manner as previously explained to control over the toll line 250 the operation of the ringing relay R350 in the toll line circuit 300 whereby the ringing transfer relay R450 is operated. Inasmuch as the line hold relay R440 is already operated at this time, ground potential is continuously applied to the C1 conductor of the trunk line 460 for maintaining the ring cutoff relay R720 in the combination connector 600 operated, notwithstanding that the relay R450 is operated; hence, the ring relay R720 is prevented from restoring and from ringing the operator at the P. B. X board 260. The relay R450 upon operating at this time completes first at contacts 453 a circuit for holding the control relay R430 operated, which holding circuit extends, specifically, from battery potential through the upper winding of relay R430, contacts 411, the upper winding of the coil 363, contacts 341, 453, the resistor 454 and contacts 443 to ground potential. In addition, the relay R450 interrupts at contacts 451 and 457, the previously traced talking loop extending from the toll line circuit 300 to the P. B. X board 260 and completes at contacts 452 and 456 a ringing loop extending from the toll line circuit 300 to the P. B. X board 260 for ringing the operator thereat. Specifically, the last mentioned loop extends from ground potential via contacts 456 over the positive line conductor of the trunk 460, the positive line wiper of the Strowger mechanism 580 in the toll selector 500, the positive line conductor of the trunk line 690, the positive line wiper of the Strowger mechanism 780 in the combination connector 600 and the positive line conductor 261B of the P. B. X trunk line 261 through the ringing apparatus in the P. B. X board 260 and over the negative line conductor 261A of the P. B. X trunk line 261, the negative line wiper of the Strowger mechanism 780 in the combination connector 600, the negative line conductor of the trunk line 690, the negative line wiper of the Strowger mechanism 580 in the toll selector 500, the negative line conductor of the trunk line 460, the contacts 522, 452 and 441 and the resistor 433 to toll ringing generator. The operator at the toll board 100 upon restoring the ringing key K173 to interrupt the first and third contacts thereof and to close the second and fourth contacts thereof causes the operated relays R140, R340 and R450 to restore whereby the previously traced holding loop for the control relay R430 in toll line circuit 300 and the previously traced ringing loop from the toll line circuit 300 to the P. B. X board 260 are interrupted and the previously traced talking loop extending from the upper and lower windings of the control relay R430 in the toll line circuit 300 to the P. B. X board 260 is recompleted. The operator at the toll board 100 may continue ringing by operating the ringing key K173 in a manner as explained until the call is answered by the operator at the P. B. X board 260, whereupon a talking connection is established between the operator at the toll board 100 in the remote exchange 10 and the operator at the P. B. X board 260 in the main exchange 20. The operator at the toll board 100 may then instruct the operator at the P. B. X board 260 concerning a desired connection and the operator at the P. B. X board 260 may then extend the established connection therefrom to a subscriber station served from the P. B. X board 260.

At the conclusion of the established connection when the subscriber at the telephone station served from the P. B. X board 260 disconnects, the established connection between the toll board 100 and the P. B. X board 260 is released, as explained in Section 4 hereof, only when both operators have interrupted the connection at their respective boards, inasmuch as the combination connector 600 is of the last party to release type. Upon interruption of the connection at the toll board 100 and at the P. B. X board 260, all of the apparatus involved in the connection therebetween is completely released and is made available for further use.

*Section 6.—Conclusions*

In view of the foregoing it is apparent that there has been provided a toll switching telephone system embodying improved control and supervisory circuit facilities permitting the direct completion of toll calls from a toll board over a two conductor toll line and for signalling the called station of the toll nature of the call without multiple handling at one or more other toll boards.

While there has been described what is at present considered to be a preferred embodiment of the invention, it is understood that various modifications may be made therein, and it is intended to cover in the appended claims all such modifications as fall within the true spirit and scope of the invention.

What is claimed is:

1. In a telephone system, an office provided with a toll board, an exchange provided with a plurality of subscriber lines, a two conductor toll line extending between said office and said exchange and accessible to said toll board, a toll line circuit in said exchange terminating said toll line and including a source of current supply, a toll selector associated with said toll line circuit, a plurality of connectors accessible to said toll selector and having access to said subscriber lines, means controllable from said toll board for seizing said toll line, means responsive to the seizure of said toll line for completing over the two conductors thereof a loop circuit of given polarity from said source of current supply and for seizing said toll line circuit, means responsive to the seizure of said toll line circuit for seizuring said toll selector, means then controllable from said toll board for interrupting and recompleting said loop circuit in order to transmit digits from said toll board over said toll line to said toll line circuit, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more of the digits transmitted thereto for operating said connector to select one of said subscriber lines, additional means in said toll selector responsive jointly to said one or more of the digits repeated thereto and to the busy condition of all of said connectors for controlling said toll line circuit to reverse the polarity of said loop circuit, and means in said office responsive to the reversal of polarity of said loop circuit for returning busy supervision to said toll board.

2. In a telephone system, an office provided with a toll board, an exchange provided with a plurality of subscriber lines, a two conductor toll line extending between said office and said exchange and accessible to said toll board, a toll line circuit in said exchange terminating said toll line and including a source of current supply, a toll selector associated with said toll line circuit, a plurality of connectors accessible to said toll selector and having access to said subscriber lines, means controllable from said toll board for seizing said toll line, a polar relay provided with two windings means in said office responsive to the seizure of said toll line for seizing said toll line circuit and for completing via the two conductors of said toll line and one winding of said polar relay a first loop circuit of a given polarity from said source of current supply and for completing a current path through the other winding of said polar relay to maintain said polar relay restored, means responsive to the seizure of said toll line circuit for seizing said toll selector, means then controllable from said toll board for interrupting said first loop circuit and said current path and for completing via the two conductors of said toll line a second loop circuit from said source of current supply and for thereafter interrupting and recompleting said second loop circuit in order to transmit digits from said toll board over said toll line to said toll line circuit and for thereafter interrupting said second loop circuit and recompleting said first loop circuit and said current path, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more of the digits transmitted thereto for operating said connector to select one of said subscriber lines, additional means in said toll selector responsive jointly to said one or more of the digits repeated thereto and to the busy condition of all of said connectors for controlling said toll line circuit to reverse the polarity of said first loop circuit, whereby said polar relay is operated, and means in said office responsive to the operation of said polar relay for returning busy supervision to said toll board.

3. In a telephone system, an office provided with a toll board, an exchange provided with a plurality of subscriber lines, a two conductor toll line extending between said office and said exchange and accessible to said toll board, a toll line circuit in said exchange terminating said toll line and including a source of current supply and a differential relay provided with two windings, a toll selector associated with said toll line circuit, a plurality of connectors accessible to said toll selector and having access to said subscriber lines, means controllable from said toll board for seizing said toll line, means responsive to the seizure of said toll line for seizing said toll line circuit and for completing via a path including one winding of said differential relay and the two conductors of said toll line and the other winding of said differential relay, a loop circuit of a given polarity from said source of circuit supply, whereby said differential relay is maintained restored, means responsive to the seizure of said toll line circuit for seizing said toll selector, means then controllable from said toll board for interrupting and recompleting said loop circuit in order to transmit digits from said toll board over said toll line to said toll line circuit, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more of the digits transmitted thereto for operating said connector to select one of said subscriber lines, additional means in said one connector responsive to the selection of said one subscriber line for controlling said toll line circuit to reverse the polarity of said loop circuit, means in said office responsive to the reversal of polarity of said loop for returning seizure supervision to said toll board, means then controllable from said toll board for interrupting said loop circuit and for completing via one conductor of said toll line and said one winding of said differential relay a current path from said source of current supply, whereby said differential relay is operated, and ringing means in said one connector controlled in response to operation of said differential relay for applying ringing signal to said one subscriber line.

4. In a telephone system, an office provided with a toll board, an exchange provided with a plurality of subscriber lines, a two conductor toll line extending between said office and said exchange and accessible to said toll board, a toll line circuit in said exchange terminating said toll line and including a source of current supply and a differential relay provided with two windings, a toll selector associated with said toll line circuit, a plurality of connectors accessible to said toll selector and having access to said subscriber lines, means controllable from said toll board for seizing said toll line, a polar relay provided with two windings, means in said office responsive to the seizure of said toll line for seizing said toll line circuit and for completing via a path including one winding of said differential relay and one conductor of said toll line and one winding of said polar relay and the other conductor of said toll line and the other winding of said differential relay a first loop circuit of given polarity from said source of current supply and for completing a current path through the other winding of said polar relay, whereby said differential relay and said polar relay are maintained restored, means responsive to the seizure of said toll line circuit for seizing said toll selector, means then controllable from said toll board for interrupting said first loop circuit and said current path and for completing via a path including one winding of said differential relay and the two conductors of said toll line and the other winding of said differential relay a second loop circuit from said source of current supply and for thereafter interrupting and recompleting said second loop circuit in order to transmit digits from said toll board over said toll line to said toll line circuit and for thereafter interrupting said second loop circuit and recompleting said first loop circuit and said current path, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more of the digits transmitted thereto for operating said connector to select one of said subscriber lines, a tester in said one connector for testing the idle and busy condition of said one subscriber line and responsive to the idle condition thereof for switching through said connector so that said toll line circuit is connected to said one subscriber line and responsive to the busy condition thereof for returning to said toll line circuit a flash busy signal, means responsive to the connection of said toll line circuit to said one subscriber line for reversing the polarity of said first loop circuit to operate said polar relay means in said office responsive to the operation of said polar relay for returning seizure supervision to said toll board, ring control means then controllable from said toll board for interrupting said first loop circuit and for completing via one conductor of said toll line and one winding of said differential relay a control circuit from said source of circuit supply in order to operate said differential relay and for thereafter interrupting said control circuit to restore said operated differential relay and for recompleting said first loop circuit, ringing means in said one connector controlled in response to the operation of said differential relay for interrupting the connection from said toll line circuit to said one subscriber line and for applying ringing signal to said one subscriber line in order to signal the subscriber station thereon of a call directed thereto and controlled in response to the answer of said call at said subscriber station for completing the connection from said toll line circuit over said one subscriber line to said subscriber station, means in said toll line circuit responsive to the completion of the connection therefrom to said subscriber station for reversing to said given polarity said first loop circuit, whereby said operated polar relay is restored and said means in said office is operated to return answer supervision to said toll board, and additional means in said toll line circuit responsive to said flash busy signal for repeatedly reversing the polarity of said first loop circuit in order to operate and restore repeatedly said polar relay, whereby said means in said office is operated to return line busy supervision to said toll board.

5. In a telephone system, an office provided with a toll board, an exchange provided with a plurality of subscriber lines, a two conductor toll line extending between said office and said exchange and accessible to said toll board, a toll line circuit in said exchange terminating said toll line and including a source of current supply and a differential relay provided with two windings, a toll selector associated with said toll line circuit a plurality of connectors accessible to said toll selector and having access to said subscriber lines, means controllable from said toll board for seizing said toll line, a polar relay provided with two windings means in said office responsive to the seizure of said toll line for seizing said toll line circuit and for completing via a path including one winding of said differential relay and one conductor of said toll line and one winding of said polar relay and the other conductor of said toll line and the other winding of said differential relay a first loop circuit of given polarity from said source of current supply and for completing a current path through the other winding of said polar relay, whereby said differential relay and said polar relay are maintained restored, means responsive to the seizure of said toll line circuit for seizing said toll selector, means then controllable from said toll board for interrupting said first loop circuit and said current path and for completing via a path including one winding of said differential relay and the two conductors of said toll line and the other winding of said differential relay a second loop circuit from said source of current supply and for thereafter interrupting and recompleting said second loop circuit in order to transmit digits from said toll board over said toll line to said toll line circuit and for thereafter interrupting said second loop circuit and recompleting said first loop circuit and said current path, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more of the digits transmitted thereto for operating said connector to select one of said subscriber lines, a tester in said one connector for testing the idle and busy condition of said one subscriber line and responsive to the idle condition thereof for switching through said connector so that said toll line circuit is connected to said one subscriber line and responsive to the busy condition thereof for returning to said toll line circuit a flash busy signal, means responsive to the connection of said toll line circuit to said one subscriber line for reversing the polarity of said first loop circuit to operate said polar relay ring control means then controlled in response to the operation of said polar relay for interrupting said first loop circuit and for completing via one conductor of said toll line and one winding of said differential relay a control circuit from said source of current supply in order to operate said differential relay and for thereafter interrupting said control circuit to restore said operated differential relay and for recompleting said first loop circuit, ringing means in said one connector controlled in response to the operation of said differential relay for interrupting the connection from said toll line circuit to said one subscriber line and for applying ringing signal to said one subscriber line in order to signal the subscriber station thereon of a call directed thereto and controlled in response to the answer of said call at said subscriber station for completing the connection from said toll line circuit over said one subscriber line to said subscriber station, means in said toll line circuit responsive to the completion of the connection therefrom to said subscriber station for reversing to said given polarity said first loop circuit, whereby said operated polar relay is restored, means in said office responsive to the restoring of said polar relay for returning answer supervision to said toll board, and additional means in said toll line circuit responsive to said flash busy signal for repeatedly reversing the polarity of said first loop circuit in order to operate and restore repeatedly said polar relay, whereby said means in said office is operated to return line busy supervision to said toll board.

6. In a telephone system, an office provided with a toll board, an exchange provided with a trunk and an associated telephone station wherein said telephone station has access to a plurality of telephone substations, a two conductor toll line extending between said office and said exchange and accessible to said toll board, a toll line circuit in said exchange terminating said toll line and including a source of current supply, and a differential relay provided with two windings, a toll selector associated with said toll line circuit, a plurality of connectors accessible to said toll selector and having access to said subscriber lines, means controllable from said toll board for seizing said toll line, a polar relay provided with two windings, means in said office responsive to the seizure of said toll line for seizing said toll line circuit and for completing via a path including one winding of said differential relay and one conductor of said toll line and one winding of said polar relay and the other conductor of said toll line and the other winding of said differential relay a first loop circuit of given polarity from said source of current supply and for completing a current path through the other winding of said polar relay, whereby said differential relay and said polar relay are maintained restored, means responsive to the seizure of said toll line circuit for seizing said toll selector, means then controllable from said toll board for interrupting said first loop circuit and said current path and for completing via a path including one winding of said differential relay and the two conductors of said toll line and the other winding of said differential relay a second loop circuit from said source of current supply and for thereafter interrupting and recompleting said second loop circuit in order to transmit digits from said toll board over said toll line to said toll line circuit and for thereafter interrupting said second loop circuit and recompleting said first loop circuit and said current path, means responsive to the digits transmitted to said toll line circuit for repeating the same to said toll selector, means in said toll selector responsive to one or more of the digits repeated thereto for operating said toll selector to select an idle one of said connectors, means in said toll selector responsive to the selection of said one connector for switching through said toll selector so that subsequent digits repeated thereto are transmitted to said one connector, means in said one connector responsive to one or more digits transmitted thereto for operating said connector to select said trunk, a tester in said one connector for testing the idle and busy condition of said trunk and responsive to the idle condition thereof for switching through said connector so that said toll line circuit is connected to said trunk and responsive to the busy condition thereof for returning to said toll line circuit a flash busy signal, means responsive to the connection of said toll line circuit to said trunk for reversing the polarity of said first loop circuit to operate said polar relay, means in said office responsive to the operation of said polar relay for returning seizure supervision to said toll board, ring control means then controllable from said toll board for interrupting said first loop circuit and for completing via one conductor of said toll line and one winding of said differential relay a control circuit from said source of current supply in order to operate said differential relay and for thereafter interrupting said control circuit to restore said operated differential relay and for recompleting said first loop circuit, ringing means in said one connector controlled in response to the operation of said differential relay for interrupting the connection from said toll line circuit to said trunk and for applying ringing signal to said trunk in order to signal the telephone station thereon of a call directed thereto and controlled in response to the answer of said call at said telephone station for completing the connection from said toll line circuit over said one trunk to said telephone station, means in said toll line circuit responsive to the completion of the connection therefrom to said telephone station for reversing to said given polarity said first loop circuit, whereby said operated polar relay is restored, and re-ring means included in said toll line circuit responsive jointly to the completion of said connection therefrom to said telephone station and to the operation of said differential relay by said ring control means for interrupting said connection over said trunk to said telephone station and for applying re-ring signal to said trunk in order to signal said telephone station of a recall thereto and responsive thereafter to the restoring of said differential relay for removing said re-ring signal from said trunk and for recompleting said connection from said toll line circuit over said trunk to said telephone station.

7. In a telephone system, an office provided with a toll board, an exchange provided with a plurality of subscriber lines and corresponding subscriber stations, a toll line extending between said exchange and said office and accessible to said toll board, a toll line circuit in said exchange terminating said toll line, a toll selector associated with said toll line circuit, a plurality of local selectors in said exchange accessible to said subscriber lines, a plurality of combination connectors each provided with a local incoming channel accessible to said local selectors, means controllable from said toll board for seizing said toll line, means responsive to the seizure of said toll line for seizing said toll line circuit, means responsive to the seizure of said toll line circuit for seizing said toll selector, means in said toll selector then controllable from said toll board for operating said toll selector to select an idle one of said combination connectors at the toll incoming channel thereof, means in said toll selector responsive to the selection of any idle one of said combination connectors for switching through said toll selector so that subsequent control from said toll board is transmitted over the toll incoming channel to the one of the combination connectors selected by said toll selector, means in said exchange controllable from any calling one of said subscriber stations for seizing an idle one of said local selectors, means in said one local selector then controllable from said calling subscriber station for operating said one local selector to select an idle one of said combination connectors at the local incoming channel thereof, means in said one local selector responsive to the selection of any idle one of said combination connectors for switching through said one local selector so that subsequent control from said one subscriber station is transmitted over said local incoming channel to the one of the combination connectors selected by said local selector, means included in any selected one of said combination connectors controllable over said toll incoming channel and controllable over said local incoming channel for operating said one combination connector to select a one of said subscriber lines, a busy switch in any one of said combination connectors operated in response to the busy condition of said selected subscriber line, an idle switch in any one of said combination connectors operated in response to the idle condition of said selected subscriber line for seizing said selected subscriber line at the control conductor thereof, whereby said selected subscriber line is marked as busy to other combination connectors having access thereto, a source of flash busy signal, a source of tone busy signal, a toll switch in any one of said combination connectors responsive jointly to the control of said combination connector over said toll incoming channel and to the operation of said idle switch for connecting the line conductors of said selected subscriber line through said one combination connector to said toll incoming channel, a local switch in any one of said combination connectors responsive jointly to the control of said one combination connector over said local incoming channel and to the operation of said busy switch for returning tone busy signal to said calling subscriber station, means in said toll line circuit controllable from any one of said toll incoming channels in response to the seizure of said one subscriber line thereover for returning to said toll board seizure supervision, additional means in said toll line circuit then controllable from said toll board for applying to said one toll incoming channel a ringing control signal, a source of toll ringing signal, a source of local ringing signal, and a ringer in any one of said combination connectors responsive jointly to the control of said combination connector over said local incoming channel and to the operation of said idle switch for applying local ringing signal over said one subscriber line to the corresponding subscriber station and responsive to said ringing control signal from said toll line circuit over said toll incoming channel for interrupting the connection from said toll incoming channel to said one subscriber line and for applying toll ringing signal over said one subscriber line to the corresponding subscriber station and responsive thereafter to the answering of the call at said subscriber station for connecting said toll incoming channel and said local incoming channel over said one subscriber line to said subscriber station, whereby the calling toll board or a calling one of said subscriber stations is connected to a called one of said subscriber stations.

No references cited.